(12) United States Patent
Narayanamoorthy et al.

(10) Patent No.: US 11,003,619 B2
(45) Date of Patent: May 11, 2021

(54) SYSTOLIC ARRAY ACCELERATOR SYSTEMS AND METHODS

(71) Applicant: INTEL CORPORATION, Santa Clara, CA (US)

(72) Inventors: Srinivasan Narayanamoorthy, Hillsboro, OR (US); Jayaram Bobba, Portland, OR (US); Ankit More, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/283,795

(22) Filed: Feb. 24, 2019

(65) Prior Publication Data

US 2020/0272596 A1 Aug. 27, 2020

(51) Int. Cl.
*G06F 15/80* (2006.01)
*G06F 17/16* (2006.01)

(52) U.S. Cl.
CPC ...... *G06F 15/8023* (2013.01); *G06F 15/8046* (2013.01); *G06F 17/16* (2013.01)

(58) Field of Classification Search
CPC .............................. G06F 17/16; G06F 15/8046
See application file for complete search history.

(56) References Cited

U.S. PATENT DOCUMENTS

| 8,924,455 | B1* | 12/2014 | Barman | G06F 7/5443 708/607 |
| 10,515,135 | B1* | 12/2019 | Zejda | G06F 17/12 |

OTHER PUBLICATIONS

European Patent Office, European Search Report dated Jul. 31, 2020 in European patent application No. EP 20 15 2535, 8 pages total.
Kung, et al., "Mapping Systolic Arrays Onto 3D Circuit Structures: Accelerating Convolutional Neural Network Interface," IEEE, Oct. 21, 2018, 8 pages.

\* cited by examiner

*Primary Examiner* — Zachary K Huson
(74) *Attorney, Agent, or Firm* — Trop, Pruner & Hu, P.C.

(57) ABSTRACT

The present disclosure is directed to systems and methods for decomposing systolic array circuitry to provide a plurality of N×N systolic sub-array circuits, apportioning a first tensor or array into a plurality of N×M first input arrays, and apportioning a second tensor or array into a plurality of M×N second input arrays. Systolic array control circuitry transfers corresponding ones of the first input arrays and second input arrays to a respective one of the plurality of N×N systolic sub-array circuits. As the elements included in the first input array and the elements included in the second input array are transferred to the systolic sub-array, the systolic sub-array performs one or more mathematical operations using the first and the second input arrays. The systems and methods beneficially improve the usage of the systolic array circuitry thereby advantageously reducing the number of clock cycles needed to perform a given number of calculations.

27 Claims, 21 Drawing Sheets

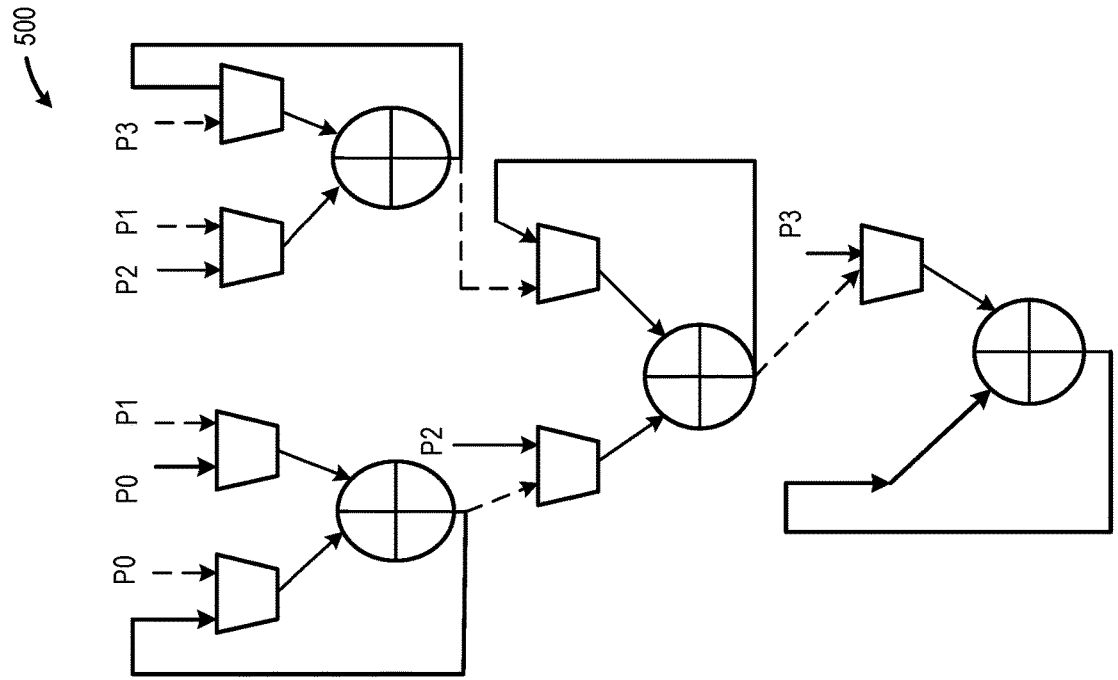
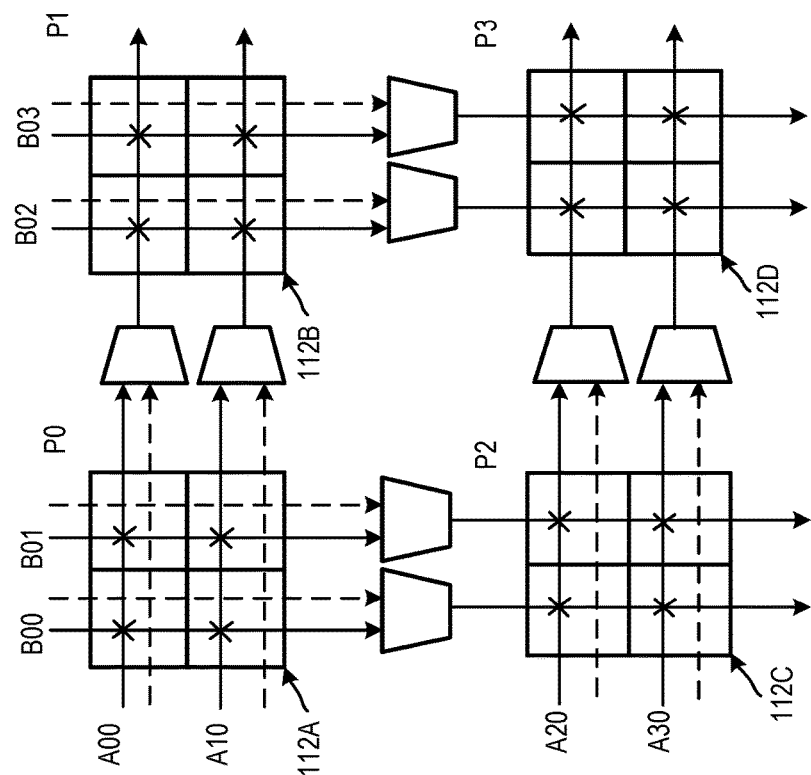
FIG. 5B
FIG. 5A

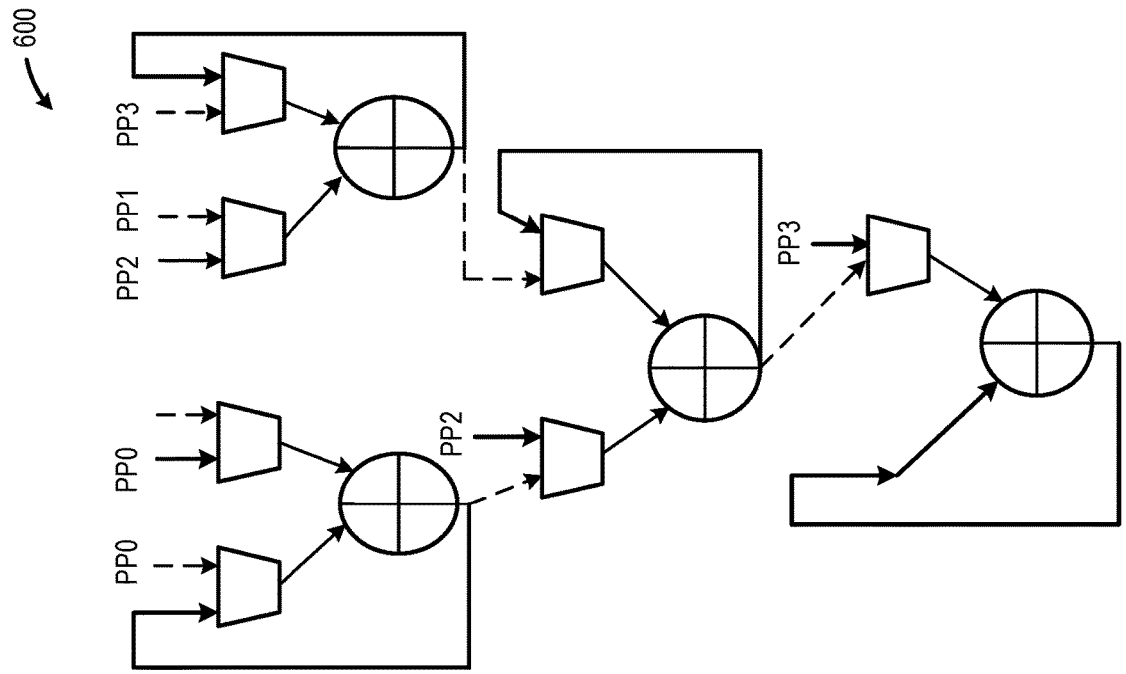
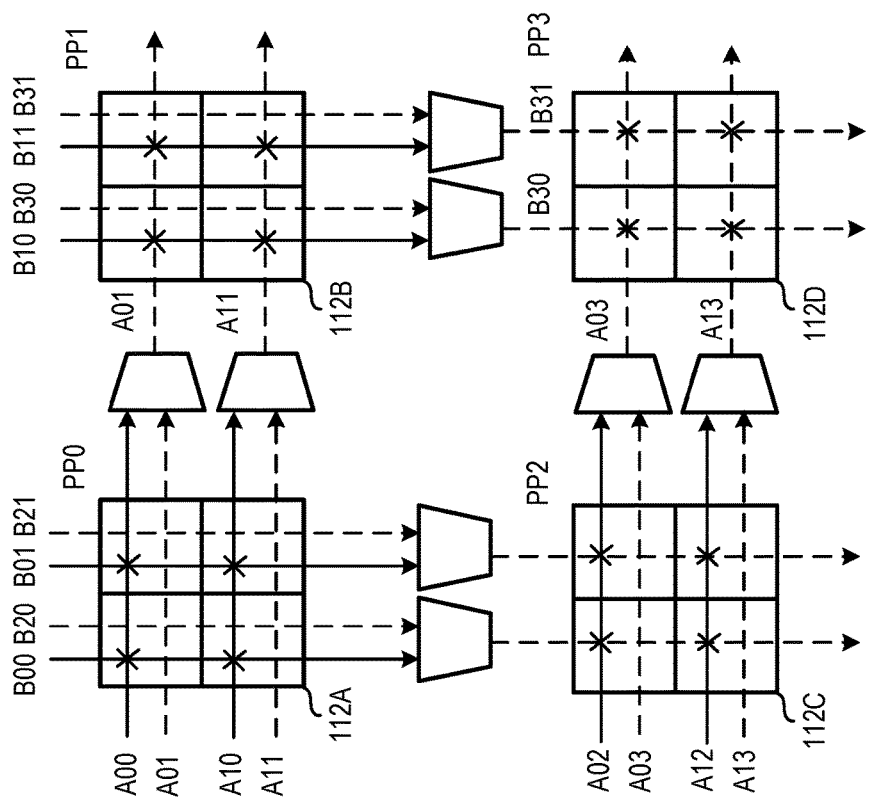
FIG. 6B
FIG. 6A

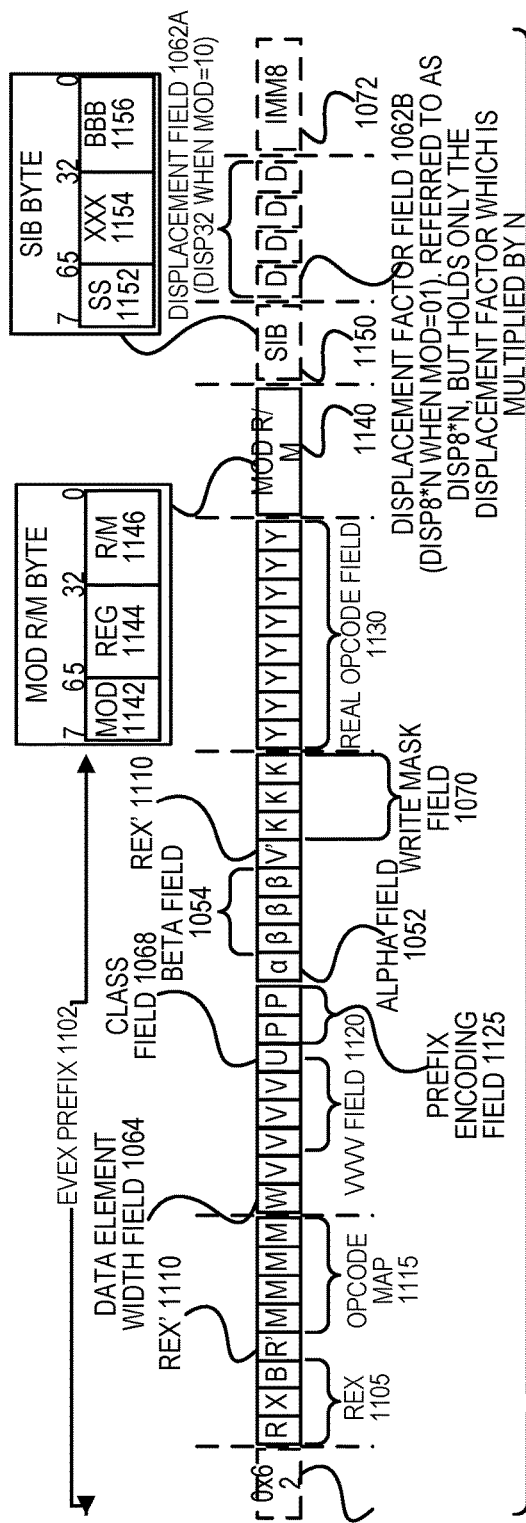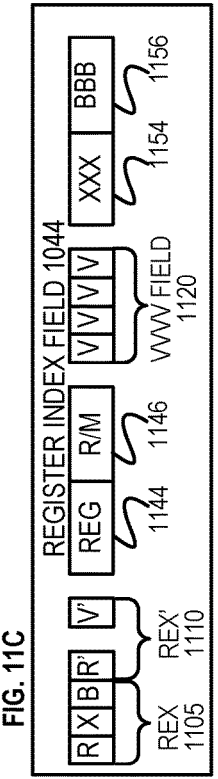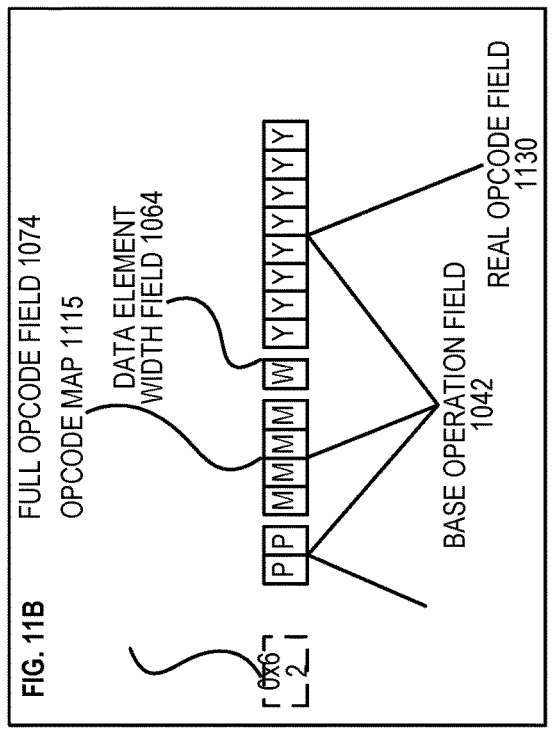
FIG. 11A
FIG. 11B
FIG. 11C

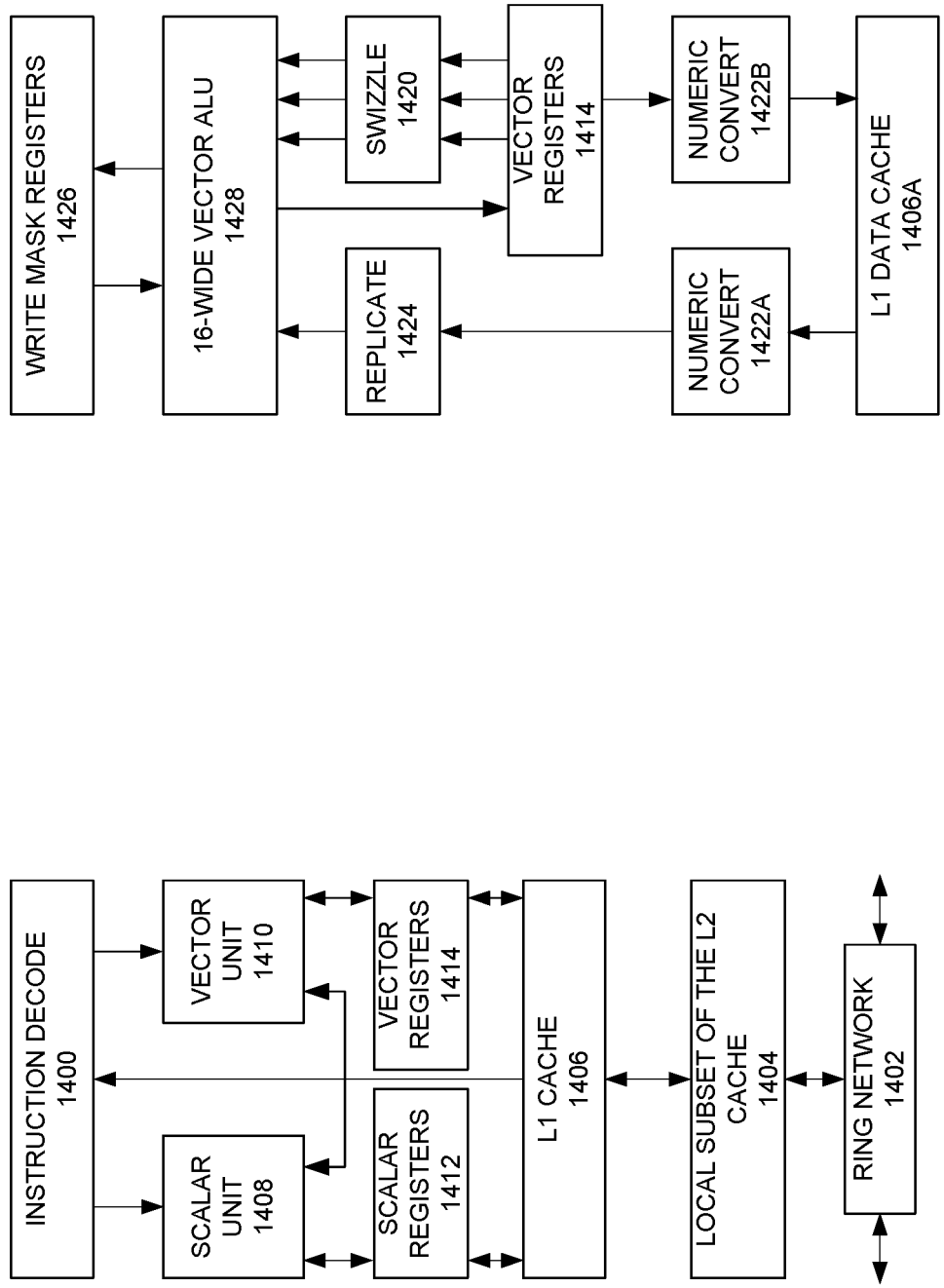

US 11,003,619 B2

SYSTOLIC ARRAY ACCELERATOR SYSTEMS AND METHODS

TECHNICAL FIELD

The present disclosure relates to accelerator circuitry, specifically to accelerators used for mathematical operations involving systolic arrays.

BACKGROUND

A systolic array includes a network of processing elements (PEs) or cells, each connected to a small number of nearest neighbors to form a mesh type topology. Each of the cells performs a sequence of operation on data that flows between the cells. Typically, the operations performed by each cell are similar or identical, with each cell performing a one or more operations on a data input to generate a data output that is passed to a neighboring cell. Systolic array accelerators provide a high throughput when the tensors used in the mathematical operations are uniform (e.g., N×N) and provide increased computational efficiency when handling relatively large tensors. The efficiency of systolic arrays is compromised when tensors used in the mathematical operations are not uniform (e.g., N×M and M×N).

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 5A is a microarchitectural diagram depicting hybrid 4×4 systolic array circuitry in a systolic array operating mode in which the tensor multiplication operation depicted in FIG. 3 is performed using illustrative 4×4 systolic array circuitry to determine the product of a 2×8 first array and an 8×2 second array, in accordance with at least one embodiment described herein;

FIG. 5B is a microarchitectural diagram depicting the summation of the partial products generated in FIG. 5A to produce the 4×4 output tensor, in accordance with at least one embodiment described herein;

FIG. 6A is a microarchitectural diagram depicting hybrid 4×4 systolic array circuitry in a 2×2 accumulate mode, in accordance with at least one embodiment described herein;

FIG. 6B is a microarchitectural diagram depicting the summation of the partial products generated in FIG. 6A to produce one or more output tensors, in accordance with at least one embodiment described herein;

FIGS. 11A through D are block diagrams illustrating an exemplary specific vector friendly instruction format according to embodiments of the invention;

FIGS. 14A through B illustrate a block diagram of a more specific exemplary in-order core architecture, which core would be one of several logic blocks (including other cores of the same type and/or different types) in a chip;

DETAILED DESCRIPTION

Figure 1:
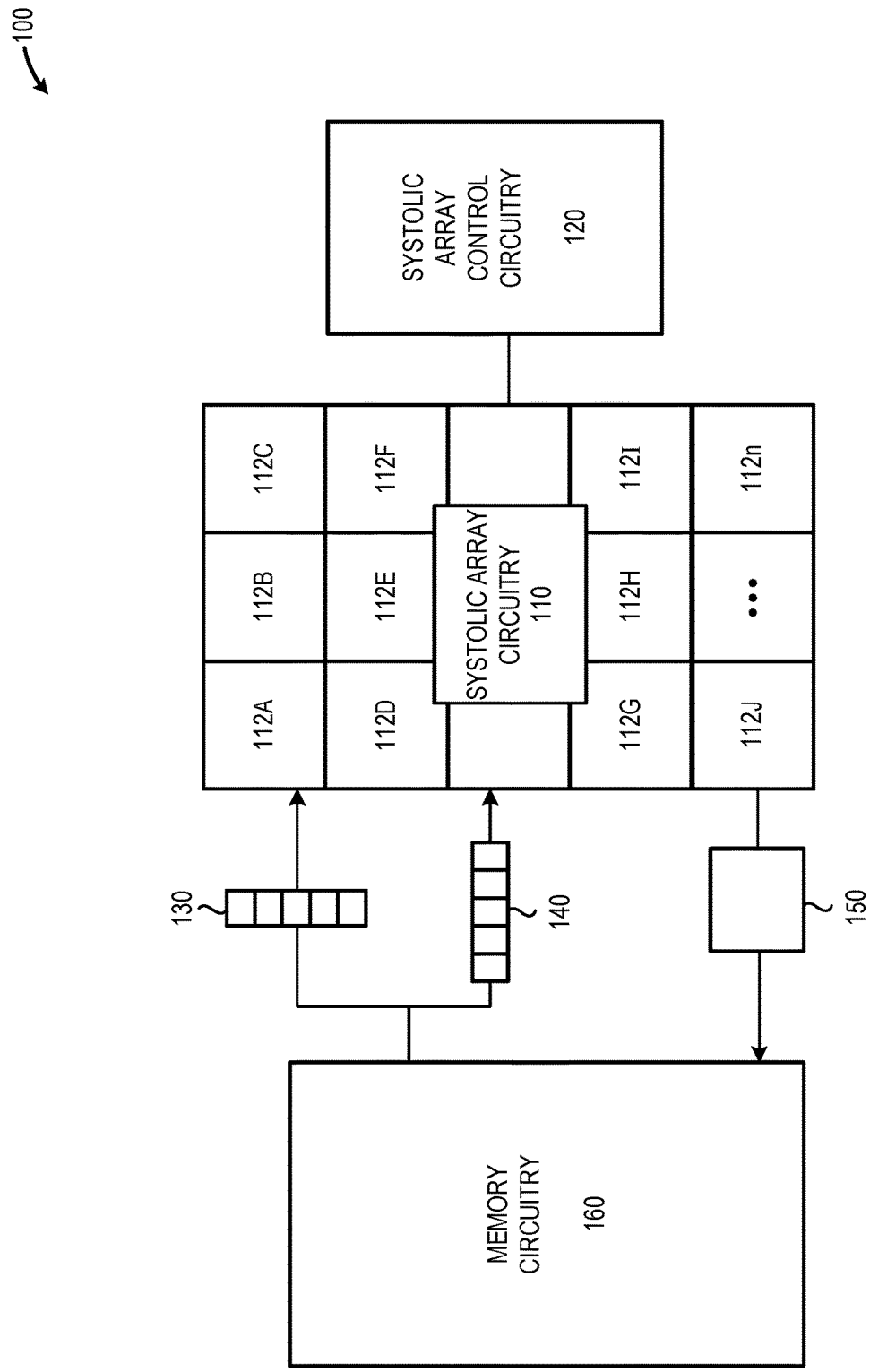
FIG. 1 is a block diagram of an illustrative system that includes systolic array circuitry, systolic array control circuitry that receives a first N×M tensor and a second M×N tensor from memory circuitry and communicates one or more N×N output tensors to the memory circuitry, in accordance with at least one embodiment described herein.

The systems and methods disclosed herein beneficially apportion irregular shaped tensors to maximize the use of cells included in a systolic array to reduce the number of clock cycles required to perform a mathematical operation using irregular shaped tensors. For example, the multiplication of a 2×4 tensor "A" with a 4×2 tensor "B" using a 4×4 systolic array multiplier would typically require four cycles. In each cycle, a 2×1 vector from tensor "A" is multiplied by a 1×2 tensor from matrix "B" using a 2×2 portion of the systolic array that is summed to yield a 2×2 product of the matrix multiplication. Since only 4 of the 16 available multiplication cells in the systolic array multiplier are used during each cycle, the utilization of the systolic array is only 25%.

The systems and methods disclosed herein beneficially maximize the utilization of the cells in the systolic array to reduce the number of cycles required to perform a mathematical operation. Using the above example, tensor "A" can be broken into four different 2×1 vectors, corresponding to the values in the first through fourth columns of tensor "A." Similarly, tensor "B" may be broken into four different 1×2 vectors, each corresponding to the values in the first through fourth rows of tensor "B." Using the systems and methods disclosed herein, in a single cycle, the product of the first column of tensor "A" and the first row of tensor "B" can be calculated using a first 2×2 portion of the 4×4 systolic array. Similarly, the second column of tensor "A" and the second row of tensor "B" can be calculated using a second 2×2 portion of the 4×4 systolic array. The products of the third and fourth rows of tensor "A" and the third and fourth columns of tensor "B" may be similarly determined using a third and fourth 2×2 portions of the 4×4 systolic array. Thus, using the systems and methods disclosed herein, the four products may be determined in a single cycle by using 100% of the multiplication cells in the 4×4 systolic array. In a second cycle, the four products may be summed to provide one or more output 2×2 matrices or tensors resulting from the multiplication of tensor "A" and tensor "B." Thus, the systems and methods disclosed herein reduced the required number of cycles by 50% by breaking the input tensors "A" and "B" into smaller arrays in order to more fully, efficiently, and effectively utilize the systolic array.

A systolic array system is provided. The system may include: systolic array circuitry and systolic array control circuitry to: decompose the systolic array circuitry into a plurality of N×N systolic sub-arrays; apportion a first input tensor into a first plurality of N×M input arrays and a second input tensor into a second plurality of M×N input arrays; and for each respective one of at least a portion of the plurality of N×N systolic sub-arrays, perform at least one mathematical operation to provide a respective one of a plurality of N×N results using corresponding ones of the N×M input arrays included in the first plurality of input arrays and the M×N input arrays included in the second plurality of input arrays.

A non-transitory storage device is provided. The non-transitory storage device may include instructions that, when executed by systolic array control circuitry, cause the systolic array control circuitry to: decompose a systolic array circuitry into a plurality of N×N systolic sub-arrays; apportion a first input tensor into a first plurality of N×M input arrays and a second input tensor into a second plurality of M×N input arrays; and for each respective one of at least a portion of the plurality of N×N systolic sub-arrays, perform at least one mathematical operation to provide a respective one of a plurality of N×N results using corresponding ones of the N×M input arrays included in the first plurality of input arrays and the M×N input arrays included in the second plurality of input arrays.

A systolic array method is provided. The method may include: decomposing, by systolic array control circuitry, a systolic array circuitry into a plurality of N×N systolic sub-arrays; apportioning, by the systolic array control circuitry, a first input tensor into a first plurality of N×M input arrays and a second input tensor into a second plurality of M×N input arrays; and for each respective one of at least a portion of the plurality of N×N systolic sub-arrays, causing the systolic array circuitry to perform at least one mathematical operation to provide a respective one of a plurality of N×N results using corresponding ones of the N×M input arrays included in the first plurality of input arrays and the M×N input arrays included in the second plurality of input arrays.

A systolic array system is provided. The system may include: means for decomposing a systolic array circuitry into a plurality of N×N systolic sub-arrays; means for apportioning a first input tensor into a first plurality of N×M input arrays and a second input tensor into a second plurality of M×N input arrays; and means for causing the systolic array circuitry to perform at least one mathematical operation to provide a respective one of a plurality of N×N results using corresponding ones of the N×M input arrays included in the first plurality of input arrays and the M×N input arrays included in the second plurality of input arrays for each respective one of at least a portion of the plurality of N×N systolic sub-arrays.

An electronic device is provided. The device may include: processor circuitry; memory circuitry; systolic array circuitry; and systolic array control circuitry to: decompose the systolic array circuitry into a plurality of N×N systolic sub-arrays; apportion a first input tensor into a first plurality of N×M input arrays and a second input tensor into a second plurality of M×N input arrays; and for each respective one of at least a portion of the plurality of N×N systolic sub-arrays, perform at least one mathematical operation to provide a respective one of a plurality of N×N results using corresponding ones of the N×M input arrays included in the first plurality of input arrays and the M×N input arrays included in the second plurality of input arrays.

FIG. 1 is a block diagram of an illustrative system 100 that includes systolic array circuitry 110, systolic array control circuitry 120 that receives a first N×M tensor 130 and a second M×N tensor 140 from memory circuitry 160 and communicates one or more N×N output tensors 150 to the memory circuitry 160, in accordance with at least one embodiment described herein. The systolic array control circuitry 120. The systolic array circuitry 110 includes a plurality of cells, each communicatively coupled to one or more neighboring cell. Each of the plurality of cells performs one or more mathematical operations, such as multiplication and/or accumulation. Advantageously, the systolic array circuitry 110 minimizes data transfers between the array and memory circuitry 160. In embodiments, the systolic array control circuitry 120 directly or indirectly transfers the first tensor 130 and the second tensor 140 from the memory circuitry 160 to the systolic array circuitry 110.

In operation, the systolic array control circuitry 120 may decompose the systolic array circuitry 110 into a plurality of N×N systolic sub-arrays 112A-112*n* (collectively "systolic sub-arrays 112"). In embodiments, the systolic array control circuitry 120 then apportions the first tensor 130 into a first plurality of N×M input arrays 132A-132*n* (collectively, "N×M input arrays 132") and the second tensor 140 into a second plurality of M×N input arrays 142A-142*n* (collectively, "M×N input arrays 142"). For each of the systolic sub-arrays 112, the systolic array control circuitry 120 then causes corresponding ones of the first plurality of N×M input arrays 132A-132n and the second plurality of M×N input arrays 142A-142n to undergo one or more mathematical operations (multiplication, accumulation, etc.) using respective ones of the systolic sub-arrays 112. In embodiments, the systolic array control circuitry 120 may combine at least a portion of the plurality of systolic sub-arrays 112A-112n to provide the one or more N×N output tensors 150. The decomposition of the systolic array 110 into a plurality of systolic sub-arrays 112 beneficially minimizes the number of memory access operations needed by maximizing the number of computations performed each clock cycle and by the retention of data within the systolic array 110.

In embodiments, the first array 130 includes an array having at least two rows and at least two columns. Each of the plurality of N×M first input arrays 132A-132n may include one or more rows and one or more columns—i.e., N may be any integer value greater than or equal to 1 and M may be any integer value greater than or equal to 1. In embodiments, the second array 140 includes an array having at least two rows and at least two columns. Each of the plurality of M×N second input arrays 142A-142n may include one or more rows and one or more columns—i.e., N may be any integer value greater than or equal to 1 and M may be any integer value greater than or equal to 1.

For example, the systolic array circuitry 110 may include a 4×4 systolic array, the first tensor 130 may include a 2×4 array, and the second tensor 140 may include a 4×2 array. The systolic array control circuitry 120 decomposes the 4×4 systolic array into a plurality of 2×2 systolic sub-arrays 112A-112D and apportions or divides the first tensor 130 into a plurality of (i.e., four) 2×1 input arrays 132A-132D and the second tensor 140 into a plurality of (i.e., four) 1×2 input arrays 142A-142D. The systolic array circuitry 110 causes the transfer of corresponding ones of the first input arrays 132A-132D and the second input arrays 142A-142D into respective ones of the systolic sub-arrays 112. Each of the systolic sub-arrays 112 performs one or more mathematical operations on the corresponding ones of the first input arrays 132A-132D and the second input arrays 142A-142D. In embodiments, the systolic array control circuitry 120 may combine at least a portion of the 2×2 systolic sub-arrays 112 to provide a 2×2 output tensor 150.

The systolic array circuitry 110 includes any number and/or combination of currently available and/or future developed electronic components, semiconductor devices, and/or logic elements that form a plurality of computational "cells" each of the plurality of cells capable of performing one or more mathematical operations (multiplication, addition, subtraction, etc.) using data, such as input arrays 132A-132n and 142A-142n. The systolic array circuitry 110 may include any number of cells. For example, the systolic array 110 may include: 16 or greater cells, 1600 or greater cells, 16,000 or greater cells, 160,000 or greater cells; 1,600,000 or greater cells; or 16,000,000 or greater cells. In embodiments, each of the cells performs the one or more mathematical operations as elements from corresponding ones of the input arrays 132A-132n and 142A-142 are transferred into the respective cell. Each of the plurality of systolic arrays 112 may include any number of cells. In embodiments, each of the plurality of systolic sub-arrays 112A-112n may include an equal number of computational cells—for example, $N^2$ cells that together form an N×N systolic sub-array 112. In embodiments, each of the plurality of cells are communicatively coupled to one or more neighboring cells such that information and/or data generated by a cell in the systolic array is available to one or more other cells in the systolic array circuitry 110. In embodiments, the systolic array circuitry 110 may be formed or disposed in, on, or about one or more semiconductor dies and/or chiplets included in a system-on-chip (SoC) or multi-chip module (MCM) architecture.

The systolic array control circuitry 120 includes any number and/or combination of currently available and/or future developed electronic components, semiconductor devices, and/or logic elements capable of executing instructions that cause the decomposition of the systolic array circuitry 110 into the plurality of systolic sub-arrays 112, causes the apportionment of the first array 130 into the plurality of first input arrays 132A-132n, causes the apportionment or division of the second array 140 into the plurality of second input arrays 142A-142n, and causes the transfer of corresponding portions of the first input arrays 132A-132n and the second input arrays 142A-142n into respective ones of the systolic sub-arrays 112A-112n. In embodiments, a processor circuit, such as a microprocessor core, may provide all or a portion of the systolic array control circuitry 120. In other embodiments, the systolic array control circuitry 120 may include one or more application specific integrated circuits (ASICs), one or more reduced instruction set computers (RISCs), one or more field programmable gate arrays (FPGAs), or similar. In embodiments, graphics processing unit (GPU) circuitry may provide all or a portion of the systolic array control circuitry 120.

The memory circuitry 160 includes any number and/or combination of currently available and/or future developed electronic components, semiconductor devices, and/or logic elements capable of storing information and/or data representative of the first array 130 and the second array 140. In embodiments, system memory circuitry may provide all or a portion of the memory circuitry 160. In embodiments, processor cache memory circuitry may provide all or a portion of the memory circuitry 160. The memory circuitry 160 may include any number, type, and/or combination of memory technology, including but not limited to: static random access memory (SRAM) and/or dynamic random access memory (DRAM).

Figure 2:
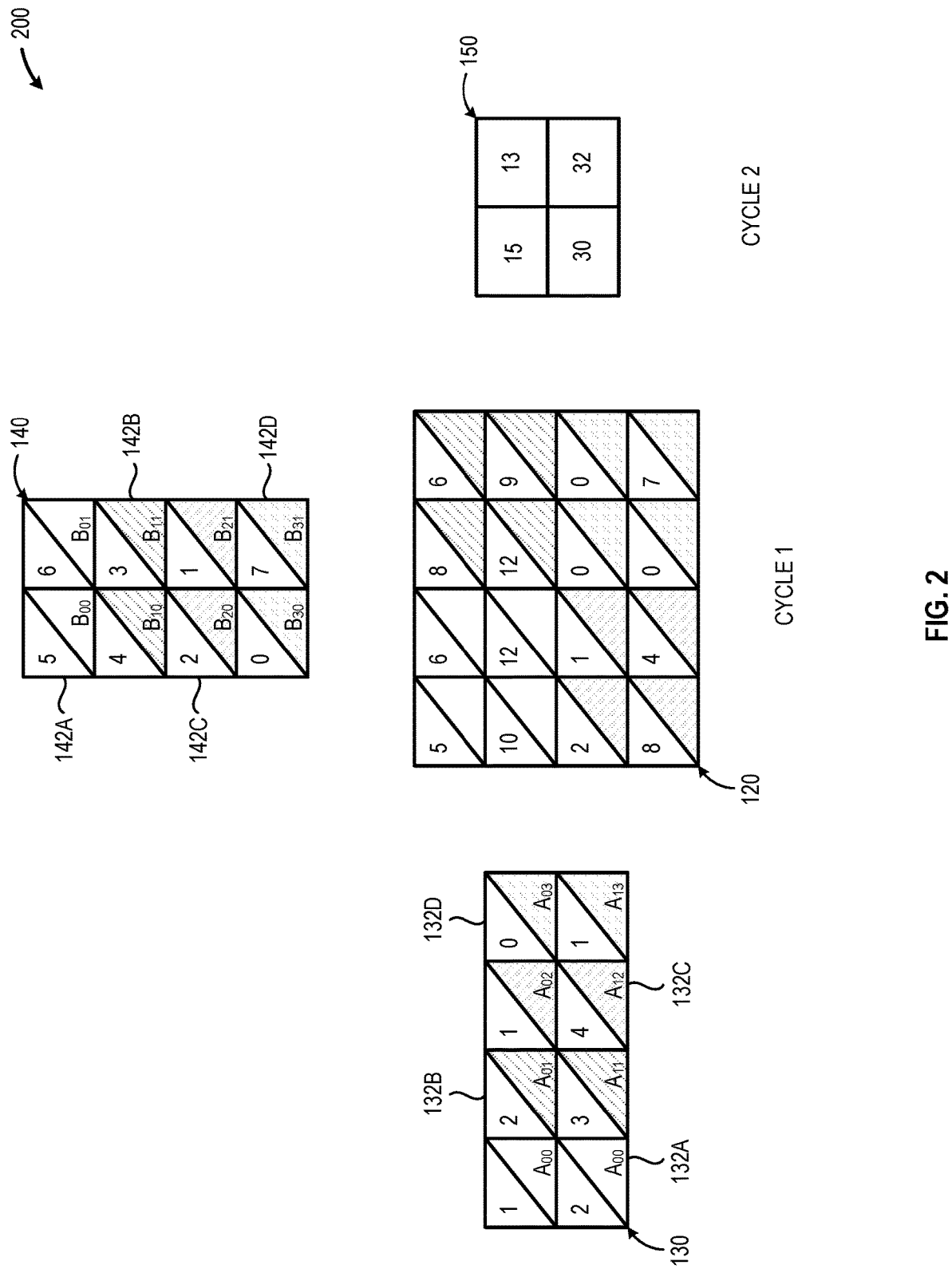
FIG. 2 is a tensor multiplication operation performed using an illustrative 4×4 systolic array to determine the product of a 2×4 first array and a 4×2 second array, in accordance with at least one embodiment described herein.

FIG. 2 is a tensor multiplication operation performed using an illustrative 4×4 systolic array to determine the product of a 2×4 first array 130 and a 4×2 second array 140, in accordance with at least one embodiment described herein. As depicted in FIG. 2, the systolic array control circuitry 120 decomposes the systolic array 120 into four 2×2 systolic sub-arrays 112A-112D. The systolic array control circuitry 120 also apportions the first array 130 into four 2×1 first input arrays 132A-132D and the second array 140 into four 1×2 second input arrays 142A-142D.

The first systolic sub-array 112A multiplies the first input array 132A and second input array 142A as the systolic array control circuitry 120 transfers the first input array 132A and the second input array 142A to the first systolic sub-array 112A. Similarly, the second systolic sub array 112B multiplies the first input array 132B and second input array 142B; the third systolic sub array 112C multiplies the first input array 132C and second input array 142C; and the fourth systolic sub array 112D multiplies the first input array 132D and second input array 142D. All of the multiplication operations occur in one clock cycle, as the input arrays 132, 142 are transferred to the systolic array 110 by the systolic array control circuitry 120. In a second clock cycle, the systolic array circuitry 110 sums the contents of the systolic sub-arrays 112A-112D to generate the output tensor 150.

Figure 3:
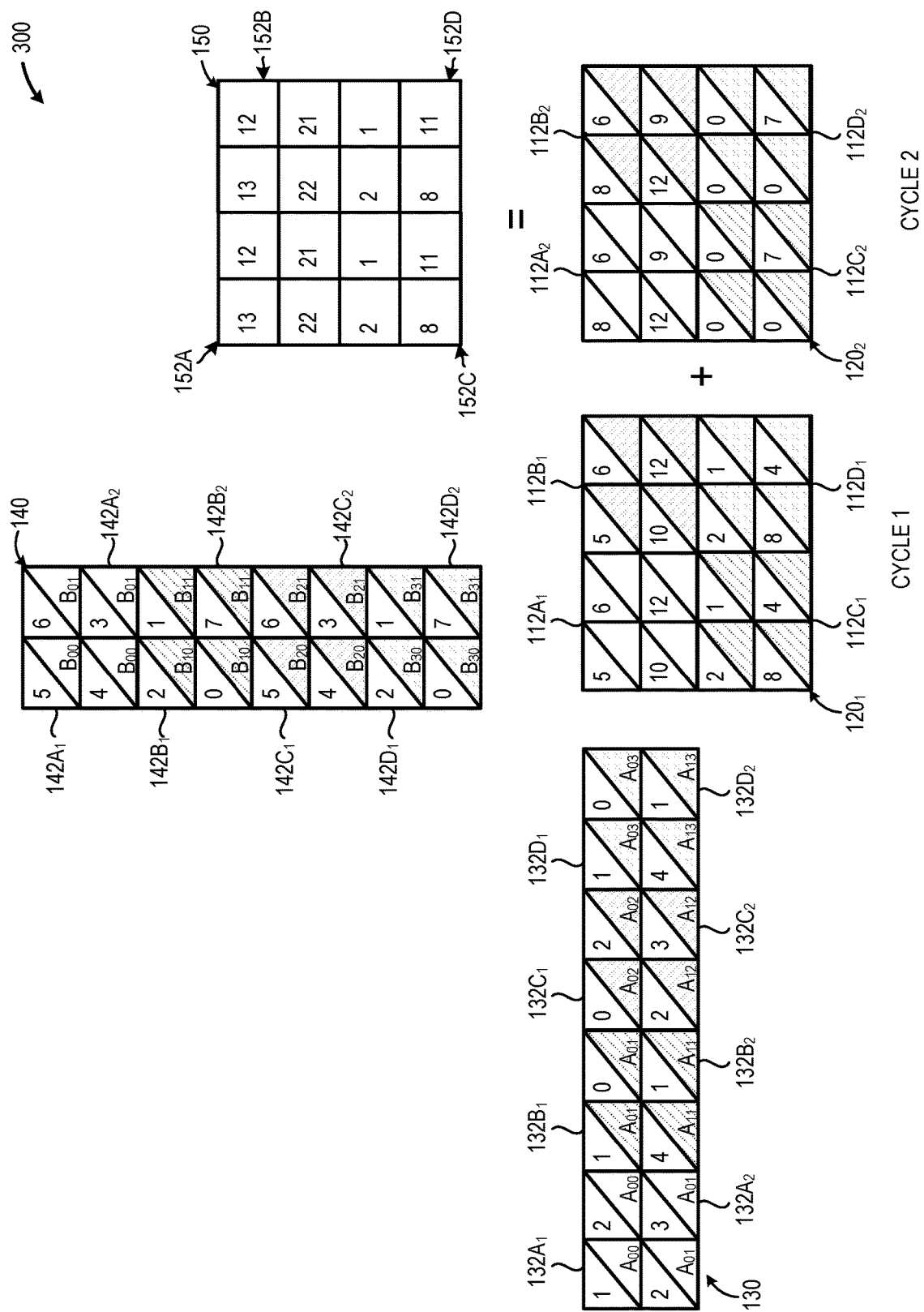
FIG. 3 is a tensor multiplication and accumulate operation performed using an illustrative 4×4 systolic array to determine the product of a 2×8 first array and an 8×2 second array, in accordance with at least one embodiment described herein.

FIG. 3 is a tensor multiplication and accumulate operation performed using an illustrative 4×4 systolic array to determine the product of a 2×8 first array 130 and an 8×2 second array 140, in accordance with at least one embodiment described herein. As depicted in FIG. 3, the systolic array control circuitry 120 decomposes the systolic array 120 into four 2×2 systolic sub-arrays 112A-112D. The systolic array control circuitry 120 also apportions the first array 130 into eight 2×1 first input arrays $132A_1$-$132D_1$ and $132A_2$-$132D_2$ and the second array 140 into eight 1×2 second input arrays $142A_1$-$142D_1$ and $142A_2$-$142D_2$.

During a first clock cycle, the first systolic sub-array $112A_1$ multiplies the first input array $132A_1$ and second input array $142A_1$ as the systolic array control circuitry 120 transfers the first input array $132A_1$ and the second input array $142A_1$ to the first systolic sub-array $112A_1$. Similarly, the second systolic sub array $112B_1$ multiplies the first input array $132B_1$ and second input array $142B_1$; the third systolic sub array $112C_1$ multiplies the first input array $132C_1$ and second input array $142C_1$; and the fourth systolic sub array $112D_1$ multiplies the first input array $132D_1$ and second input array $142D_1$. Each of the multiplication operations occur in one clock cycle, as the input arrays $132A_1$, $142A_1$ are transferred to the systolic array 110 by the systolic array control circuitry 120.

During a second clock cycle, the first systolic sub-array $112A_2$ multiplies the first input array $132A_2$ and second input array $142A_2$ and accumulates the sum of $112A_1$ and $112A_2$ as a total 152A as the systolic array control circuitry 120 transfers the first input array $132A_2$ and the second input array $142A_2$ to the first systolic sub-array $112A_2$. Similarly, the second systolic sub array $112B_2$ multiplies the first input array $132B_2$ and second input array $142B_2$ and accumulates the sum in 152B; the third systolic sub array $112C_2$ multiplies the first input array $132C_2$ and second input array $142C_2$ and accumulates the sum in 152C; and the fourth systolic sub array $112D_2$ multiplies the first input array $132D_2$ and second input array $142D_2$ and accumulates the sum in 152D. Each of the multiplication and accumulation operations occur in the second clock cycle, as the input arrays are transferred to the systolic array 110 by the systolic array control circuitry 120.

Figure 4B:
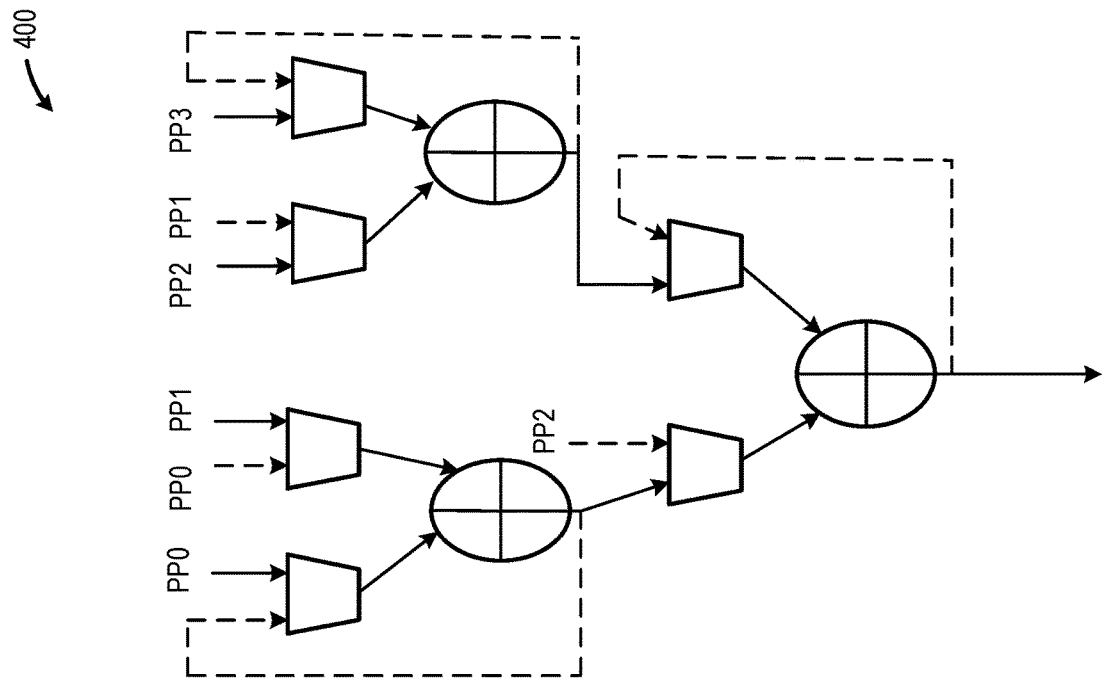
FIG. 4B is a microarchitectural diagram depicting the summation of the partial products generated in FIG. 4A to produce a 2×2 output tensor, in accordance with at least one embodiment described herein.
Figure 4A:
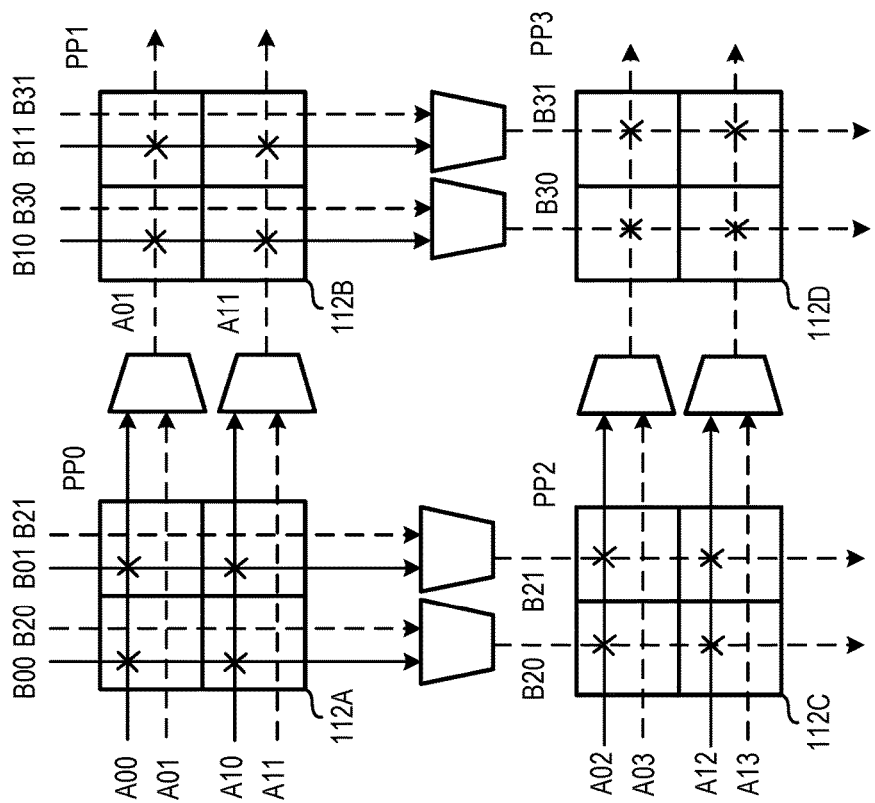
FIG. 4A is a microarchitectural diagram depicting hybrid 4×4 systolic array circuitry in a 2×2 reduce mode in which the tensor multiplication operation depicted in FIG. 2 is performed using illustrative 4×4 systolic array circuitry to determine the product of a 2×4 first array and a 4×2 second array, in accordance with at least one embodiment described herein.

FIG. 4A is a microarchitectural diagram depicting hybrid 4×4 systolic array circuitry 110 in a 2×2 reduce mode in which the tensor multiplication operation depicted in FIG. 2 is performed using illustrative 4×4 systolic array circuitry 110 to determine the product of a 2×4 first array 130 and a 4×2 second array 140, in accordance with at least one embodiment described herein. FIG. 4B is a microarchitectural diagram depicting the summation of the partial products generated in FIG. 4A to produce a 2×2 output tensor 150, in accordance with at least one embodiment described herein. Referring first to FIG. 4A, the first input values 132A-132D from the first array 130 ($A_{00}$-$A_{13}$—ref. FIG. 2) are multiplied by the appropriate second input values 142A-142D from the second array 140 ($B_{00}$-$B_{31}$—ref. FIG. 2) as the systolic array control circuitry 120 causes the transfer of the first array 130 and the second array 140 to the systolic array circuitry 110. As a result of the transfer, the systolic array 120 generates four partial products $PP_0$-$PP_4$. Referring next to FIG. 4B, the 2×2 output tensor 150 is generated by summing corresponding elements in from each of the four 2×2 systolic sub-arrays 112A-112D. The systolic array control circuitry 120 causes a summation of the four partial products generated by the systolic array circuitry 110 to produce the 2×2 output tensor 150.

FIG. 5A is a microarchitectural diagram depicting hybrid 4×4 systolic array circuitry 110 in a systolic array operating mode in which the tensor multiplication operation depicted in FIG. 3 is performed using illustrative 4×4 systolic array circuitry 110 to determine the product of a 2×8 first array 130 and an 8×2 second array 140, in accordance with at least one embodiment described herein. FIG. 5B is a microarchitectural diagram depicting the summation of the partial products generated in FIG. 5A to produce the 4×4 output tensor 150, in accordance with at least one embodiment described herein. Referring first to FIG. 5A, during a first clock cycle, the first input values $132A_1$-$132D_1$ included in the first tensor 130 ($A_{00}$-$A_{13}$—ref. FIG. 3) are multiplied by the appropriate second input values $142A_1$-$142D_1$ from the second tensor 140 ($B_{00}$-$B_{31}$—ref. FIG. 3). The multiplicative products generated during the first clock cycle are accumulated in each of the systolic sub-arrays 112A-112D. During a second clock cycle, the first input values $132A_2$-$132D_2$ included in the first tensor 130 ($A_{00}$-$A_{13}$—ref. FIG. 3) are multiplied by the appropriate second input values $142A_2$-$142D_2$ from the second tensor 140 ($B_{00}$-$B_{31}$—ref. FIG. 3).

The systolic array control circuitry 120 causes the combination of the multiplicative products generated during the second clock cycle with the accumulated products generated by each of the systolic sub-arrays 112A-112D during the first clock cycle to provide accumulated values in each of the systolic sub-arrays 112. Referring next to FIG. 5B, the systolic array control circuitry 120 causes a summation of the multiplicative products generated by the systolic array circuitry 110 to produce the 4×4 output tensor 150. The 4×4 output tensor 150 is generated by summing corresponding elements in from each of the four 2×2 systolic sub-arrays 112A-112D.

FIG. 6A is a microarchitectural diagram depicting hybrid 4×4 systolic array circuitry 110 in a 2×2 accumulate mode, in accordance with at least one embodiment described herein. FIG. 6B is a microarchitectural diagram depicting the summation of the partial products generated in FIG. 6A to produce the one or more output tensors 150, in accordance with at least one embodiment described herein. Referring first to FIG. 6A, during a first clock cycle, the first input values $132A_1$-$132D_1$ included in the first tensor 130 are multiplied by the appropriate second input values $142A_1$-$142D_1$ from the second tensor 140. The multiplicative products generated during the first clock cycle are accumulated in each of the systolic sub-arrays 112A-112D. During each subsequent clock cycle, the respective first input values $132A_{2\text{-}n}$-$132D_{2\text{-}n}$ included in the first tensor 130 are multiplied by the appropriate second input values $142A_{2\text{-}n}$-$142D_{2\text{-}n}$ from the second tensor 140.

The systolic array control circuitry 120 causes the combination of the multiplicative products generated during each clock cycle with the accumulated products generated by each of the systolic sub-arrays 112A-112D during the prior clock cycle(s) to provide accumulated values in each of the systolic sub-arrays 112. Referring next to FIG. 6B, the systolic array control circuitry 120 causes a summation of the multiplicative products generated by the systolic array circuitry 110 to produce the one or more output tensors 150. The one or more output tensors 150 may be generated by summing corresponding elements in from each of the four 2×2 systolic sub-arrays 112A-112D.

Figure 7:
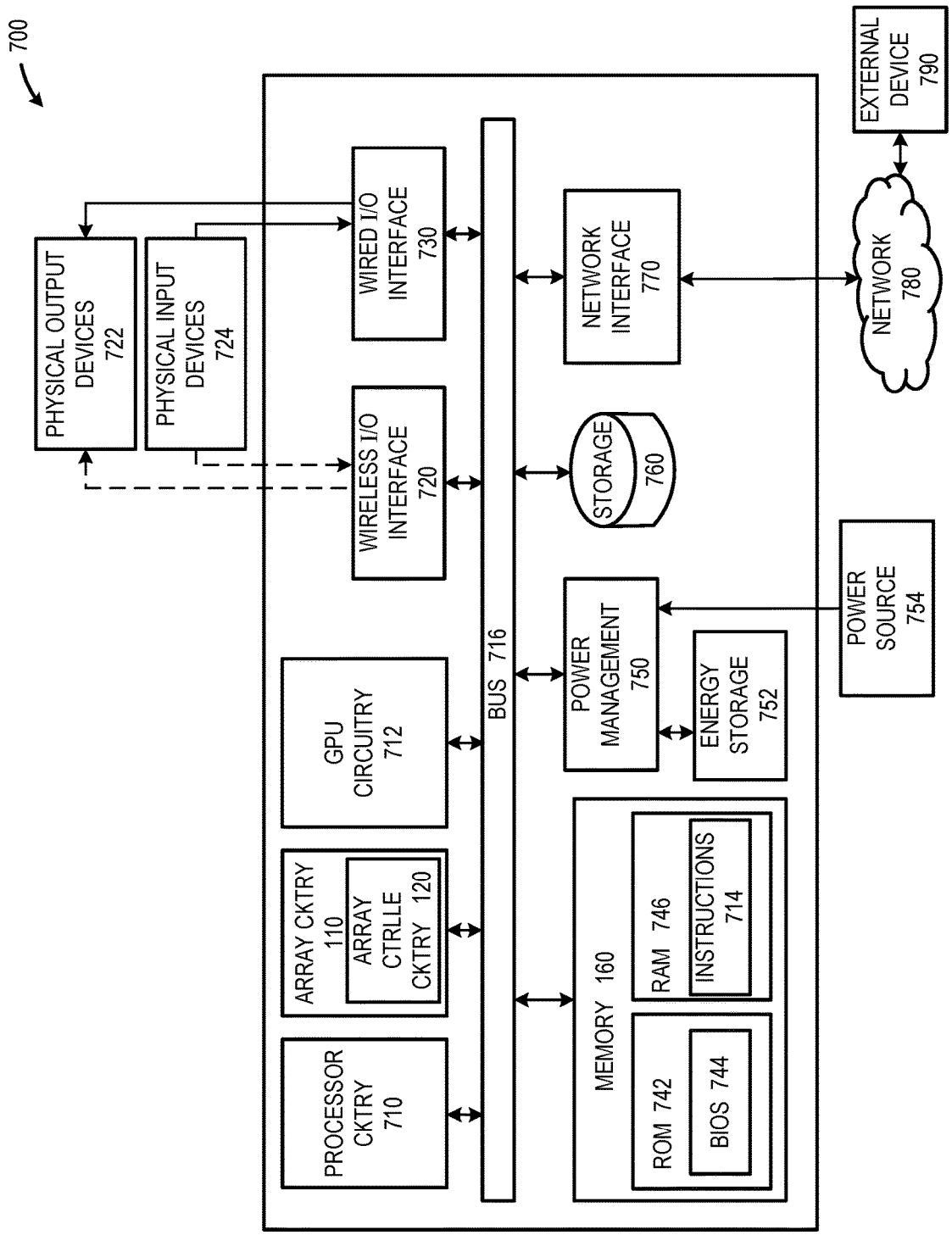
FIG. 7 is a schematic diagram of an illustrative electronic, processor-based, device that includes a central processing unit (CPU) or processor circuitry, systolic array circuitry, systolic array control circuitry, and system memory circuitry, in accordance with at least one embodiment described herein.

FIG. 7 is a schematic diagram of an illustrative electronic, processor-based, device 700 that includes a central processing unit (CPU) or processor circuitry 710, systolic array circuitry 110, systolic array control circuitry 120, and system memory circuitry 160, in accordance with at least one embodiment described herein. The processor-based device 700 may additionally include graphical processing unit (GPU) circuitry 712. The processor-based device 700 may additionally include one or more of the following: a wireless input/output (I/O) interface 720, a wired I/O interface 730, power management circuitry 750, a non-transitory storage device 760, and a network interface 770 used to communicatively couple the processor-based device 700 to one or more external devices (e.g., a cloud-based server) 790 via one or more networks 780. The following discussion provides a brief, general description of the components forming the illustrative processor-based device 700. Example, non-limiting processor-based devices 700 may include, but are not limited to: autonomous motor vehicles, semi-autonomous motor vehicles, manually controlled motor vehicles, smartphones, wearable computers, portable computing devices, handheld computing devices, desktop computing devices, blade server devices, workstations, and similar.

Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 710 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 700 includes a bus or similar communications link 716 that communicably couples and facilitates the exchange of information and/or data between various system components including the processor circuitry 710, the graphics processor circuitry 712, one or more wireless I/O interfaces 720, one or more wired I/O interfaces 730, the system memory 160, one or more storage devices 760, and/or the network interface circuitry 770. The processor-based device 700 may be referred to in the singular herein, but this is not intended to limit the embodiments to a single processor-based device 700, since in certain embodiments, there may be more than one processor-based device 700 that incorporates, includes, or contains any number of communicably coupled, collocated, or remote networked circuits or devices.

The processor circuitry 710 may include any number, type, or combination of currently available or future developed devices capable of executing machine-readable instruction sets. The processor circuitry 710 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 716 that interconnects at least some of the components of the processor-based device 700 may employ any currently available or future developed serial or parallel bus structures or architectures.

The system memory 160 may include read-only memory ("ROM") 742 and random access memory ("RAM") 746. A portion of the ROM 742 may be used to store or otherwise retain a basic input/output system ("BIOS") 744. The BIOS 744 provides basic functionality to the processor-based device 700, for example by causing the processor circuitry 110 to load and/or execute one or more machine-readable instruction sets 714. In embodiments, at least some of the one or more machine-readable instruction sets 714 cause at least a portion of the processor circuitry 710 to provide, create, produce, transition, and/or function as a dedicated, specific, and particular machine.

The processor-based device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The processor-based device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include but are not limited to: universal serial bus (USB), IEEE 1394 ("FireWire"), and similar.

The processor-based device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the processor-based device 700.

The one or more data storage devices 660 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor circuitry 710 and/or graphics processor circuitry 712 and/or one or more applications executed on or by the processor circuitry 710 and/or graphics processor circuitry 712. In some instances, one or more data storage devices 760 may be communicably coupled to the processor circuitry 710, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or WiFi®, etc.).

Machine-readable instruction sets 714 and other programs, applications, logic sets, and/or modules may be stored in whole or in part in the system memory 160. Such instruction sets 714 may be transferred, in whole or in part, from the one or more data storage devices 760. The instruction sets 714 may be loaded, stored, or otherwise retained in system memory 160, in whole or in part, during execution by the processor circuitry 710 and/or graphics processor circuitry 712.

The processor-based device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the processor-based device 700. The power source 754 may include, but is not limited to, a solar power system, a commercial electric grid, a portable generator, an external energy storage device, or any combination thereof.

For convenience, the processor circuitry 710, the GPU circuitry 712, the wireless I/O interface 720, the wired I/O interface 730, the system memory circuitry 160, the power management circuitry 750, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor circuitry 710 and/or the graphics processor circuitry 712. In some embodiments, all or a portion of the bus 716 may be omitted and the components are coupled directly to each other using suitable wired or wireless connections.

Figure 8:
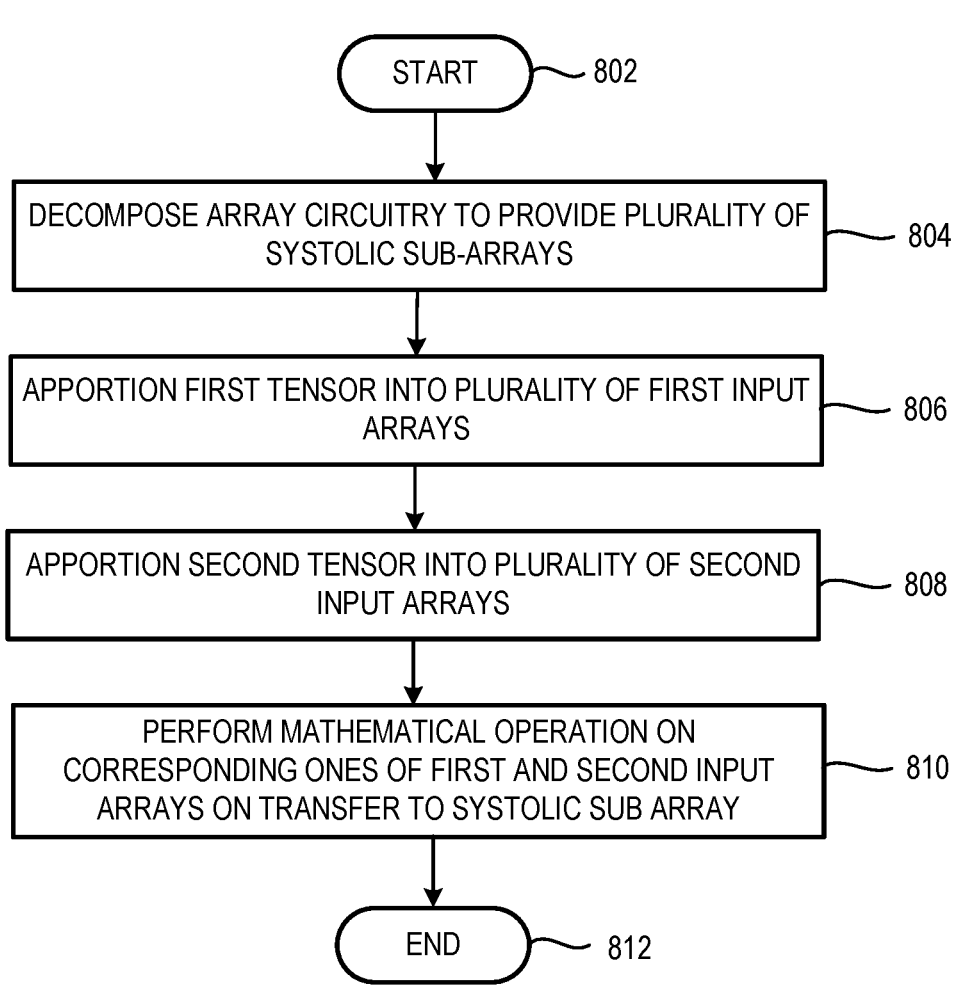
FIG. 8 is a high-level flow diagram of an illustrative method of apportioning a first array to provide a plurality of N×M first input arrays and a second array to provide a plurality of M×N second input arrays and decomposing systolic array circuitry to provide a plurality systolic sub-arrays, in accordance with at least one embodiment described herein.

FIG. 8 is a high-level flow diagram of an illustrative method 800 of apportioning a first array 130 to provide a plurality of N×M first input arrays 132 and a second array 140 to provide a plurality of M×N second input arrays 142 and decomposing systolic array circuitry 110 to provide a plurality systolic sub-arrays 112, in accordance with at least one embodiment described herein. Systolic array control circuitry 120 transfers corresponding elements of the first and the second input arrays 130, 140 to respective ones of the plurality of systolic sub arrays 112 which perform one or more mathematical operations on the elements of the first and the second input arrays 130, 140. The method 700 beneficially improves efficiency and reduces latency, particular for irregular shaped input arrays. The method 800 commences at 802.

At 804, systolic array control circuitry 120 decomposes array circuitry 110 to provide a plurality of N×N systolic array circuits 112A-112n. In embodiments, the array circuitry 110 may include any number of computational cells arranged in an array having any number of rows and any number of columns. In embodiments, the systolic array control circuitry 120 may decompose the systolic array circuitry 110 to any number of systolic sub-array circuits 112A-112n. In embodiments, each of the systolic sub-array circuits 112 may have any number of rows and any number of columns. In embodiments, each of the systolic sub-array circuits 112 may have an equal number of rows and columns (e.g., a 2×2 or 3×3 array).

At 806, the systolic array control circuitry 120 apportions a first tensor or array 130 into a plurality of N×M first input arrays 132A-132n. In embodiments, the N×M first input arrays 132 may have any number of rows and any number of columns.

At 808, the systolic array control circuitry 120 apportions a second tensor or array 140 into a plurality of N×M second input arrays 142A-142n. In embodiments, the N×M second input arrays 142 may have any number of rows and any number of columns.

At 810, the systolic array control circuitry 120 transfers corresponding elements of each of the first input arrays 132 and the second input arrays 142 to respective ones of the plurality of systolic sub-arrays 112. In embodiments, one or more mathematical operations are performed using elements of the first input arrays 132 and the second input arrays 142 as the systolic array control circuitry 120 transfers the input arrays 132, 142 to the systolic sub-arrays 112. The method 800 concludes at 812.

Figure 9:
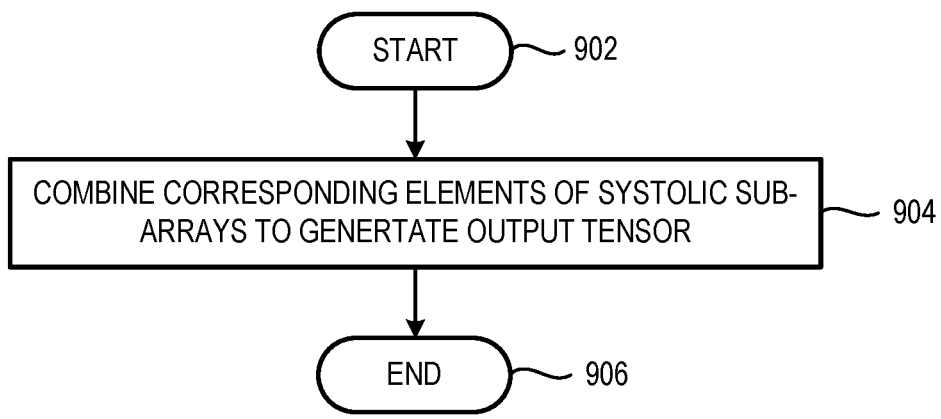
FIG. 9 is a high-level flow diagram of an illustrative method of generating one or more output tensors by summing corresponding elements included in at least a portion of the systolic sub-arrays, in accordance with at least one embodiment described herein.

FIG. 9 is a high-level flow diagram of an illustrative method 900 of generating one or more output tensors by summing corresponding elements included in at least a portion of the systolic sub-arrays 112, in accordance with at least one embodiment described herein. The method 900 commences at 902.

At 904, the systolic array control circuitry 120 combines corresponding elements of each of at least some of the plurality of systolic sub-arrays 112 to generate one or more output tensors 150. In embodiments, the systolic array control circuitry 120 may sum corresponding elements of each of at least some of the plurality of systolic sub-arrays 112 to generate the one or more output tensors 150. The method 900 concludes at 906.

The figures below detail exemplary architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 10A:
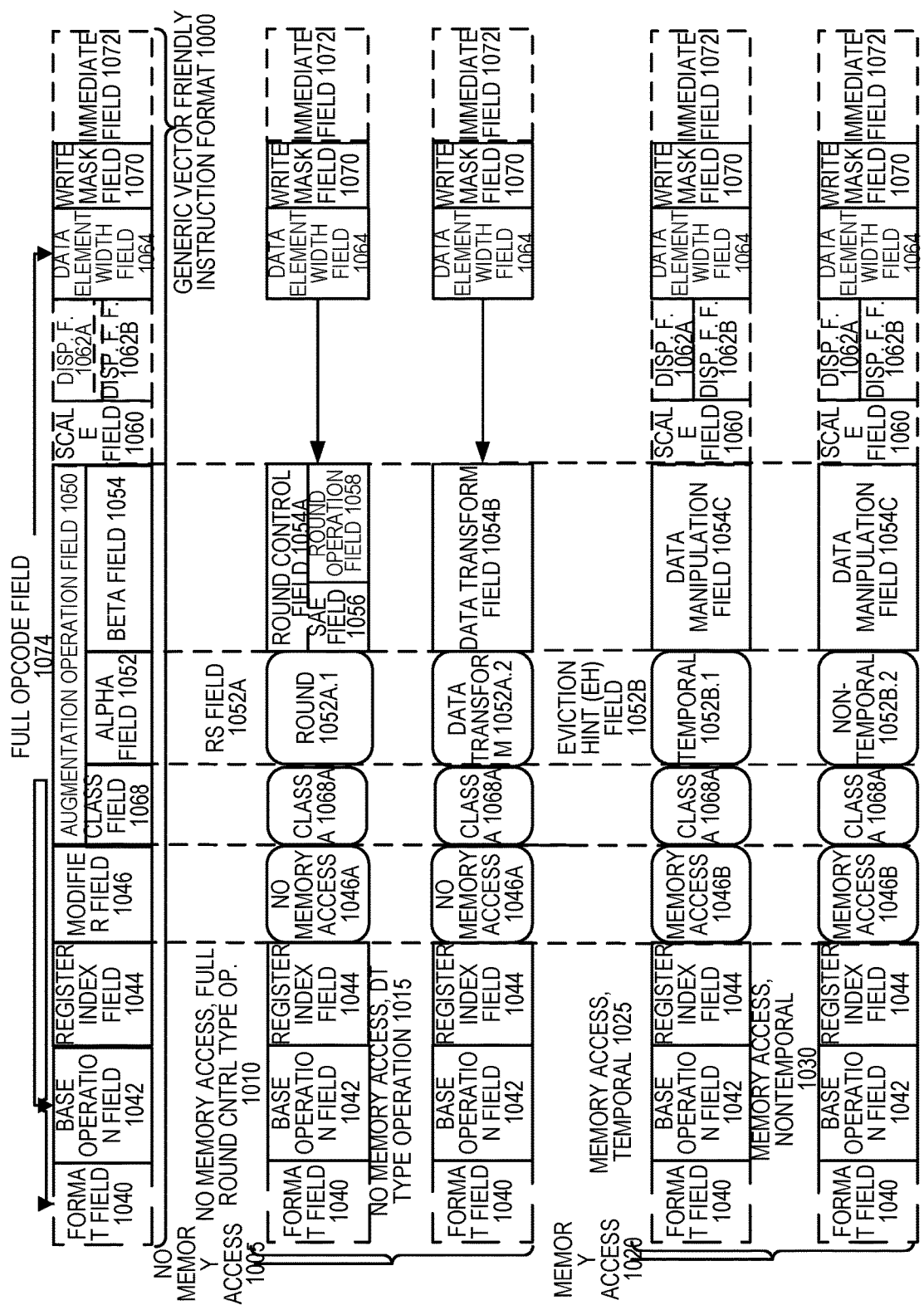
FIGS. 10A through 10B are block diagrams illustrating a generic vector friendly instruction format and instruction templates thereof according to embodiments of the invention.
Figure 10B:
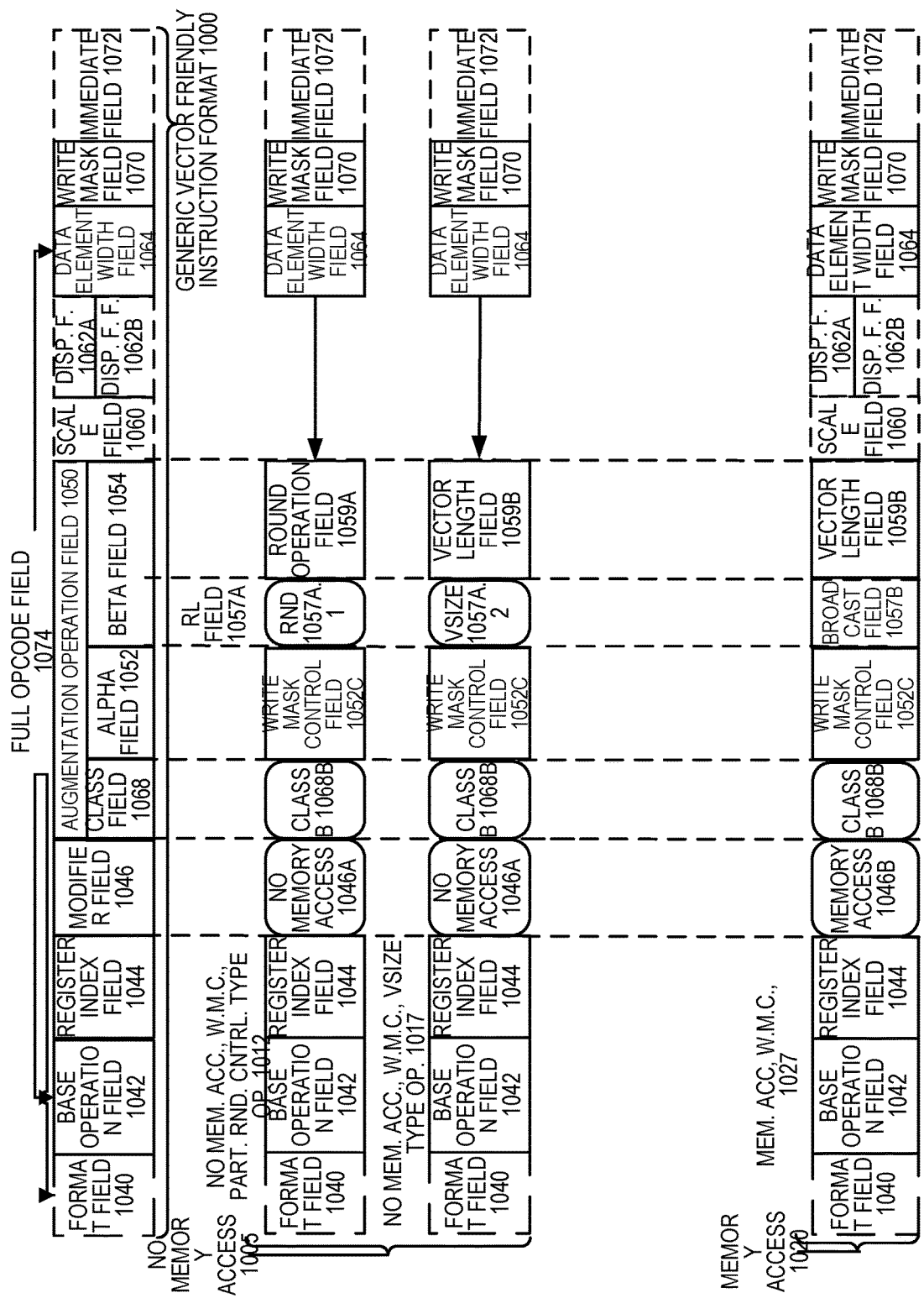

FIGS. 10A and 10B are block diagrams illustrating a generic vector friendly instruction format and instruction templates thereof according to embodiments of the invention. FIG. 10A is a block diagram illustrating a generic vector friendly instruction format and class A instruction templates thereof according to embodiments of the invention; while FIG. 10B is a block diagram illustrating the generic vector friendly instruction format and class B instruction templates thereof according to embodiments of the invention. Specifically, a generic vector friendly instruction format 1000 for which are defined class A and class B instruction templates, both of which include no memory access 1005 instruction templates and memory access 1020 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 10A include: 1) within the no memory access 1005 instruction templates there is shown a no memory access, full round control type operation 1010 instruction template and a no memory access, data transform type operation 1015 instruction template; and 2) within the memory access 1020 instruction templates there is shown a memory access, temporal 1025 instruction template and a memory access, non-temporal 1030 instruction template. The class B instruction templates in FIG. 10B include: 1) within the no memory access 1005 instruction templates there is shown a no memory access, write mask control, partial round control type operation 1012 instruction template and a no memory access, write mask control, vsize type operation 1017 instruction template; and 2) within the memory access 1020 instruction templates there is shown a memory access, write mask control 1027 instruction template.

The generic vector friendly instruction format 1000 includes the following fields listed below in the order illustrated in FIGS. 10A-10B.

Format field 1040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1042—its content distinguishes different base operations.

Register index field 1044—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1046—its content distinguishes occurrences of instructions in the generic vector instruction format that specify memory access from those that do not; that is, between no memory access 1005 instruction templates and memory access 1020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1050—its content distinguishes which one of a variety of different operations to be performed in addition to the base operation. This field is context specific. In one embodiment of the invention, this field is divided into a class field 1068, an alpha field 1052, and a beta field 1054. The augmentation operation field 1050 allows common groups of operations to be performed in a single instruction rather than 2, 3, or 4 instructions.

Scale field 1060—its content allows for the scaling of the index field's content for memory address generation (e.g., for address generation that uses $2^{scale}$*index+base).

Displacement Field 1062A—its content is used as part of memory address generation (e.g., for address generation that uses $2^{scale}$*index+base+displacement).

Displacement Factor Field 1062B (note that the juxtaposition of displacement field 1062A directly over displacement factor field 1062B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1074 (described later herein) and the data manipulation field 1054C. The displacement field 1062A and the displacement factor field 1062B are optional in the sense that they are not used for the no memory access 1005 instruction templates and/or different embodiments may implement only one or none of the two.

Data element width field 1064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1070 allows for partial vector operations, including loads, stores, arithmetic, logical, etc. While embodiments of the invention are described in which the write mask field's 1070 content selects one of a number of write mask registers that contains the write mask to be used (and thus the write mask field's 1070 content indirectly identifies that masking to be performed), alternative embodiments instead or additional allow the mask write field's 1070 content to directly specify the masking to be performed.

Immediate field 1072—its content allows for the specification of an immediate. This field is optional in the sense that is it not present in an implementation of the generic vector friendly format that does not support immediate and it is not present in instructions that do not use an immediate.

Class field 1068—its content distinguishes between different classes of instructions. With reference to FIGS. 10A-B, the contents of this field select between class A and class B instructions. In FIGS. 10A-B, rounded corner squares are used to indicate a specific value is present in a field (e.g., class A 1068A and class B 1068B for the class field 1068 respectively in FIGS. 10A-B).

Instruction Templates of Class A

In the case of the non-memory access 1005 instruction templates of class A, the alpha field 1052 is interpreted as an RS field 1052A, whose content distinguishes which one of the different augmentation operation types are to be performed (e.g., round 1052A.1 and data transform 1052A.2 are respectively specified for the no memory access, round type operation 1010 and the no memory access, data transform type operation 1015 instruction templates), while the beta field 1054 distinguishes which of the operations of the specified type is to be performed. In the no memory access 1005 instruction templates, the scale field 1060, the displacement field 1062A, and the displacement scale filed 1062B are not present.

No-Memory Access Instruction Templates—Full Round Control Type Operation

In the no memory access full round control type operation 1010 instruction template, the beta field 1054 is interpreted as a round control field 1054A, whose content(s) provide static rounding. While in the described embodiments of the invention the round control field 1054A includes a suppress all floating point exceptions (SAE) field 1056 and a round operation control field 1058, alternative embodiments may support may encode both these concepts into the same field or only have one or the other of these concepts/fields (e.g., may have only the round operation control field 1058).

SAE field 1056—its content distinguishes whether or not to disable the exception event reporting; when the SAE field's 1056 content indicates suppression is enabled, a given instruction does not report any kind of floating-point exception flag and does not raise any floating point exception handler.

Round operation control field 1058—its content distinguishes which one of a group of rounding operations to perform (e.g., Round-up, Round-down, Round-towards-zero and Round-to-nearest). Thus, the round operation control field 1058 allows for the changing of the rounding mode on a per instruction basis. In one embodiment of the invention where a processor includes a control register for specifying rounding modes, the round operation control field's 1050 content overrides that register value.

No Memory Access Instruction Templates—Data Transform Type Operation

In the no memory access data transform type operation 1015 instruction template, the beta field 1054 is interpreted as a data transform field 1054B, whose content distinguishes which one of a number of data transforms is to be performed (e.g., no data transform, swizzle, broadcast).

In the case of a memory access 1020 instruction template of class A, the alpha field 1052 is interpreted as an eviction hint field 1052B, whose content distinguishes which one of the eviction hints is to be used (in FIG. 10A, temporal 1052B.1 and non-temporal 1052B.2 are respectively specified for the memory access, temporal 1025 instruction template and the memory access, non-temporal 1030 instruction template), while the beta field 1054 is interpreted as a data manipulation field 1054C, whose content distinguishes which one of a number of data manipulation operations (also known as primitives) is to be performed (e.g., no manipulation; broadcast; up conversion of a source; and down conversion of a destination). The memory access 1020 instruction templates include the scale field 1060, and optionally the displacement field 1062A or the displacement scale field 1062B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1052 is interpreted as a write mask control (Z) field 1052C, whose content distinguishes whether the write masking controlled by the write mask field 1070 should be a merging or a zeroing.

In the case of the non-memory access 1005 instruction templates of class B, part of the beta field 1054 is interpreted as an RL field 1057A, whose content distinguishes which one of the different augmentation operation types are to be performed (e.g., round 1057A.1 and vector length (VSIZE) 1057A.2 are respectively specified for the no memory access, write mask control, partial round control type operation 1012 instruction template and the no memory access, write mask control, VSIZE type operation 1017 instruction template), while the rest of the beta field 1054 distinguishes which of the operations of the specified type is to be performed. In the no memory access 1005 instruction templates, the scale field 1060, the displacement field 1062A, and the displacement scale filed 1062B are not present.

In the no memory access, write mask control, partial round control type operation 1010 instruction template, the rest of the beta field 1054 is interpreted as a round operation field 1059A and exception event reporting is disabled (a given instruction does not report any kind of floating-point exception flag and does not raise any floating point exception handler).

Round operation control field 1059A—just as round operation control field 1058, its content distinguishes which one of a group of rounding operations to perform (e.g., Round-up, Round-down, Round-towards-zero and Round-to-nearest). Thus, the round operation control field 1059A allows for the changing of the rounding mode on a per instruction basis. In one embodiment of the invention where a processor includes a control register for specifying rounding modes, the round operation control field's 1050 content overrides that register value.

In the no memory access, write mask control, VSIZE type operation 1017 instruction template, the rest of the beta field 1054 is interpreted as a vector length field 1059B, whose content distinguishes which one of a number of data vector lengths is to be performed on (e.g., 128, 256, or 512 byte).

In the case of a memory access 1020 instruction template of class B, part of the beta field 1054 is interpreted as a broadcast field 1057B, whose content distinguishes whether or not the broadcast type data manipulation operation is to be performed, while the rest of the beta field 1054 is interpreted the vector length field 1059B. The memory access 1020 instruction templates include the scale field 1060, and optionally the displacement field 1062A or the displacement scale field 1062B.

With regard to the generic vector friendly instruction format 1000, a full opcode field 1074 is shown including the format field 1040, the base operation field 1042, and the data element width field 1064. While one embodiment is shown where the full opcode field 1074 includes all of these fields, the full opcode field 1074 includes less than all of these fields in embodiments that do not support all of them. The full opcode field 1074 provides the operation code (opcode).

The augmentation operation field 1050, the data element width field 1064, and the write mask field 1070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 11 is a block diagram illustrating an exemplary specific vector friendly instruction format according to embodiments of the invention. FIG. 11 shows a specific vector friendly instruction format 1100 that is specific in the sense that it specifies the location, size, interpretation, and order of the fields, as well as values for some of those fields. The specific vector friendly instruction format 1100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 10 into which the fields from FIG. 11 map are illustrated.

It should be understood that, although embodiments of the invention are described with reference to the specific vector friendly instruction format 1100 in the context of the generic vector friendly instruction format 1000 for illustrative purposes, the invention is not limited to the specific vector friendly instruction format 1100 except where claimed. For example, the generic vector friendly instruction format 1000 contemplates a variety of possible sizes for the various fields, while the specific vector friendly instruction format 1100 is shown as having fields of specific sizes. By way of specific example, while the data element width field 1064 is illustrated as a one bit field in the specific vector friendly instruction format 1100, the invention is not so limited (that is, the generic vector friendly instruction format 1000 contemplates other sizes of the data element width field 1064).

The generic vector friendly instruction format 1000 includes the following fields listed below in the order illustrated in FIG. 11A.

EVEX Prefix (Bytes 0-3) 1102—is encoded in a four-byte form.

Format Field 1040 (EVEX Byte 0, bits [7:0])—the first byte (EVEX Byte 0) is the format field 1040 and it contains 0x62 (the unique value used for distinguishing the vector friendly instruction format in one embodiment of the invention).

The second-fourth bytes (EVEX Bytes 1-3) include a number of bit fields providing specific capability.

REX field 1105 (EVEX Byte 1, bits [7-5])—consists of a EVEX.R bit field (EVEX Byte 1, bit [7]—R), EVEX.X bit field (EVEX byte 1, bit [6]—X), and 1057BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1010—this is the first part of the REX' field 1010 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1115 (EVEX byte 1, bits [3:0]—mmmm)—its content encodes an implied leading opcode byte (0F, 0F 38, or 0F 3).

Data element width field 1064 (EVEX byte 2, bit [7]—W)—is represented by the notation EVEX.W. EVEX.W is used to define the granularity (size) of the datatype (either 32-bit data elements or 64-bit data elements).

EVEX.vvvv 1120 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1120 encodes the 4 low-order bits of the first source register specifier stored in inverted (1s complement) form. Depending on the instruction, an extra different EVEX bit field is used to extend the specifier size to 32 registers.

EVEX.U 1068 Class field (EVEX byte 2, bit [2]—U)—If EVEX.U=0, it indicates class A or EVEX.U0; if EVEX.U=1, it indicates class B or EVEX.U1.

Prefix encoding field 1125 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1052 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1054 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1010—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1070 (EVEX byte 3, bits [2:0]—kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1130 (Byte 4) is also known as the opcode byte. Part of the opcode is specified in this field.

MOD R/M Field 1140 (Byte 5) includes MOD field 1142, Reg field 1144, and R/M field 1146. As previously described, the MOD field's 1142 content distinguishes between memory access and non-memory access operations. The role of Reg field 1144 can be summarized to two situations: encoding either the destination register operand or a source register operand, or be treated as an opcode extension and not used to encode any instruction operand. The role of R/M field 1146 may include the following: encoding the instruction operand that references a memory address, or encoding either the destination register operand or a source register operand.

Scale, Index, Base (SIB) Byte (Byte 6)—As previously described, the scale field's 1050 content is used for memory address generation. SIB.xxx 1154 and SIB.bbb 1156—the contents of these fields have been previously referred to with regard to the register indexes Xxxx and Bbbb.

Displacement field 1062A (Bytes 7-10)—when MOD field 1142 contains 10, bytes 7-10 are the displacement field 1062A, and it works the same as the legacy 32-bit displacement (disp32) and works at byte granularity.

Displacement factor field 1062B (Byte 7)—when MOD field 1142 contains 01, byte 7 is the displacement factor field 1062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1062B is a reinterpretation of disp8; when using displacement factor field 1062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1062B substitutes the legacy x86 instruction set 8-bit displacement. Thus, the displacement factor field 1062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1072 operates as previously described.

Full Opcode Field

FIG. 11B is a block diagram illustrating the fields of the specific vector friendly instruction format 1100 that make up the full opcode field 1074 according to one embodiment of the invention. Specifically, the full opcode field 1074 includes the format field 1040, the base operation field 1042, and the data element width (W) field 1064. The base operation field 1042 includes the prefix encoding field 1125, the opcode map field 1115, and the real opcode field 1130.

Register Index Field

FIG. 11C is a block diagram illustrating the fields of the specific vector friendly instruction format 1100 that make up the register index field 1044 according to one embodiment of the invention. Specifically, the register index field 1044 includes the REX field 1105, the REX' field 1110, the MODR/M.reg field 1144, the MODR/M.r/m field 1146, the VVVV field 1120, xxx field 1154, and the bbb field 1156.

Augmentation Operation Field

Figure 11D:
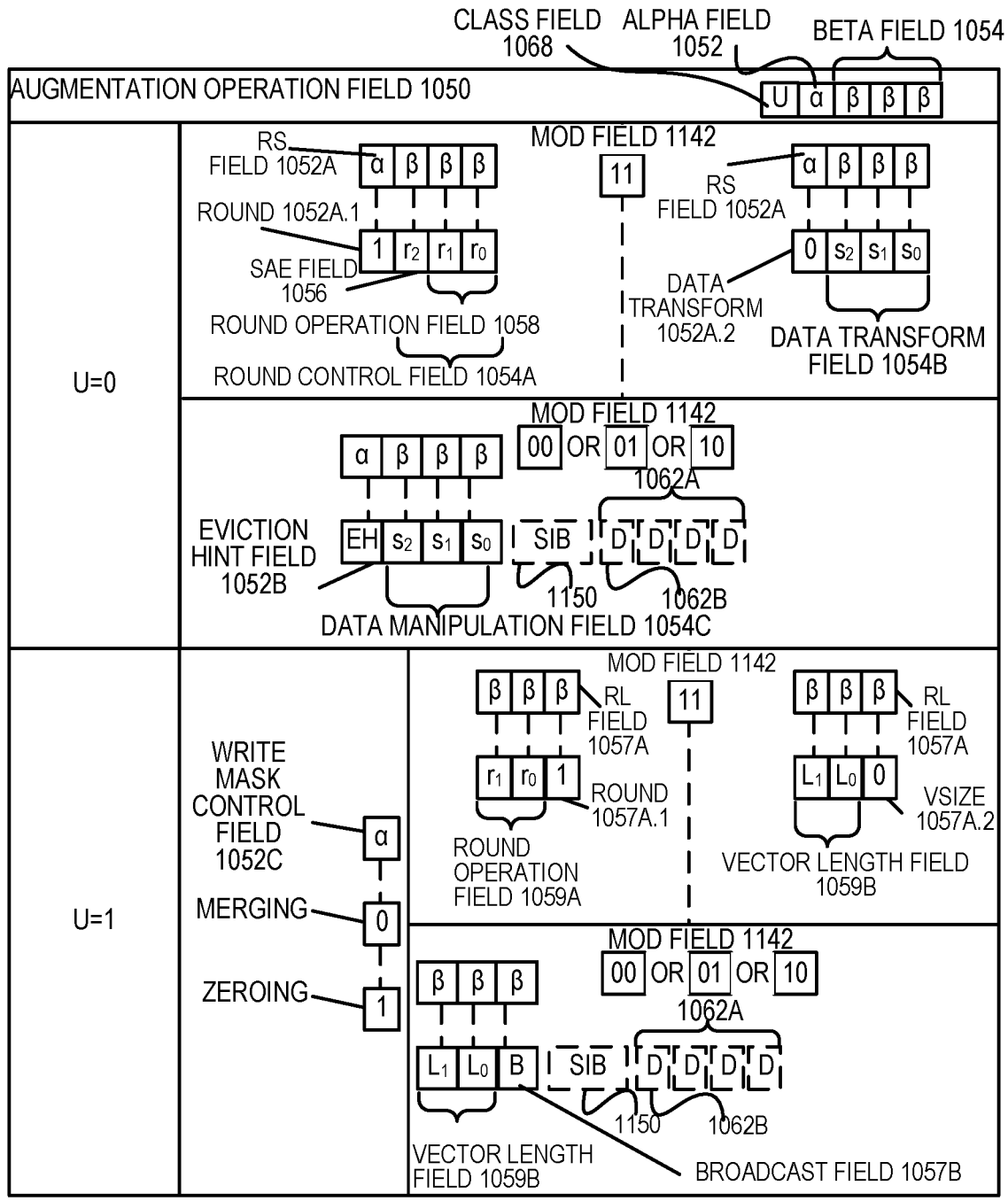

FIG. 11D is a block diagram illustrating the fields of the specific vector friendly instruction format 1100 that make up the augmentation operation field 1050 according to one embodiment of the invention. When the class (U) field 1068 contains 0, it signifies EVEX.U0 (class A 1068A); when it contains 1, it signifies EVEX.U1 (class B 1068B). When U=0 and the MOD field 1142 contains 11 (signifying a no memory access operation), the alpha field 1052 (EVEX byte 3, bit [7]—EH) is interpreted as the rs field 1052A. When the rs field 1052A contains a 1 (round 1052A.1), the beta field 1054 (EVEX byte 3, bits [6:4]—SSS) is interpreted as the round control field 1054A. The round control field 1054A includes a one bit SAE field 1056 and a two bit round operation field 1058. When the rs field 1052A contains a 0 (data transform 1052A.2), the beta field 1054 (EVEX byte 3, bits [6:4]—SSS) is interpreted as a three bit data transform field 1054B. When U=0 and the MOD field 1142 contains 00, 01, or 10 (signifying a memory access operation), the alpha field 1052 (EVEX byte 3, bit [7]—EH) is interpreted as the eviction hint (EH) field 1052B and the beta field 1054 (EVEX byte 3, bits [6:4]—SSS) is interpreted as a three bit data manipulation field 1054C.

When U=1, the alpha field 1052 (EVEX byte 3, bit [7]—EH) is interpreted as the write mask control (Z) field 1052C. When U=1 and the MOD field 1142 contains 11 (signifying a no memory access operation), part of the beta field 1054 (EVEX byte 3, bit [4]—$S_0$) is interpreted as the RL field 1057A; when it contains a 1 (round 1057A.1) the rest of the beta field 1054 (EVEX byte 3, bit [6-5]—$S_{2-1}$) is interpreted as the round operation field 1059A, while when the RL field 1057A contains a 0 (VSIZE 1057.$A_2$) the rest of the beta field 1054 (EVEX byte 3, bit [6-5]—$S_{2-1}$) is interpreted as the vector length field 1059B (EVEX byte 3, bit [6-5]—$L_{1-0}$). When U=1 and the MOD field 1142 contains 00, 01, or 10 (signifying a memory access operation), the beta field 1054 (EVEX byte 3, bits [6:4]—SSS) is interpreted as the vector length field 1059B (EVEX byte 3, bit [6-5]—$L_{1-0}$) and the broadcast field 1057B (EVEX byte 3, bit [4]—B).

Exemplary Register Architecture

Figure 12:
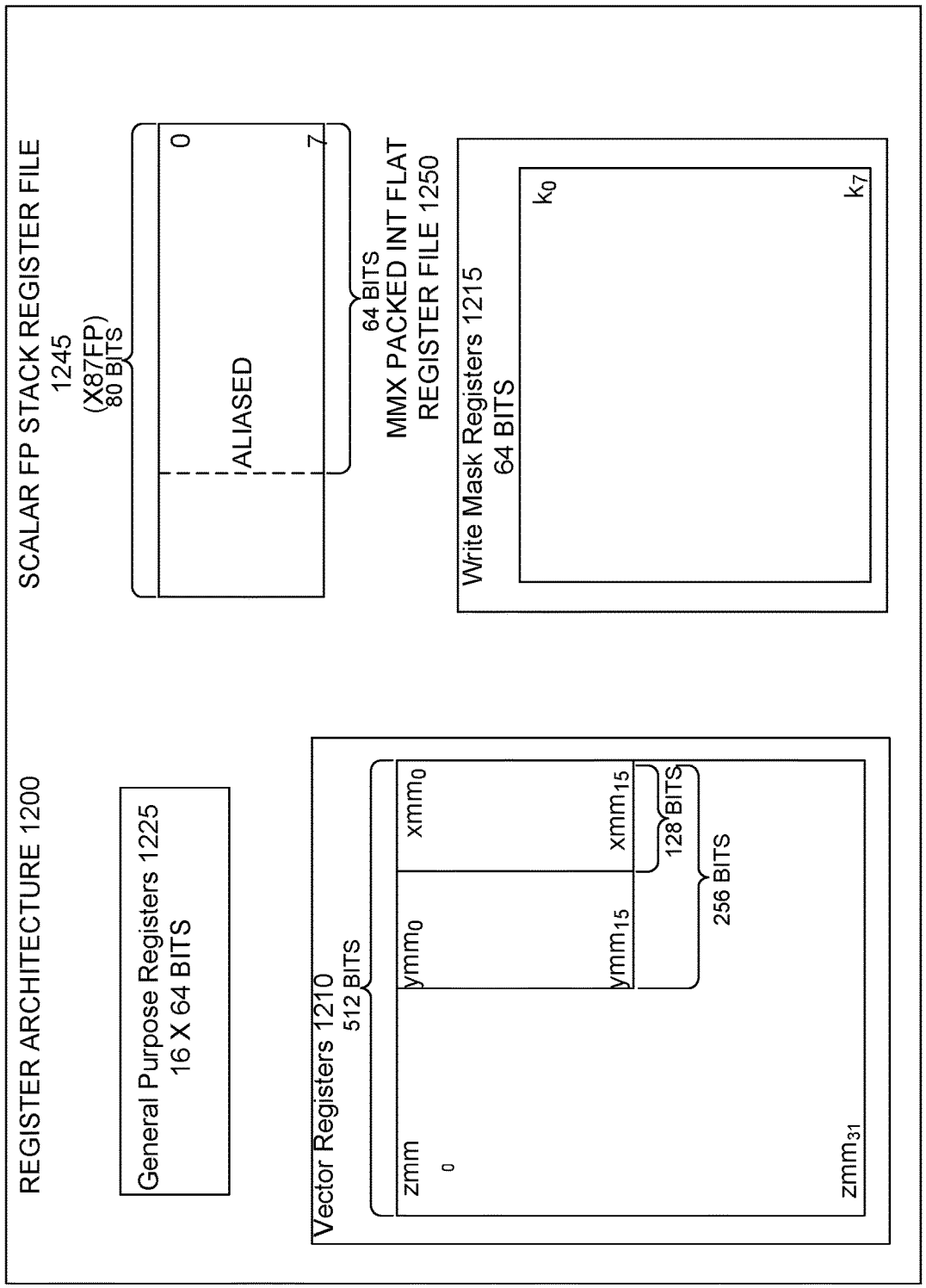
FIG. 12 is a block diagram of a register architecture according to one embodiment of the invention.

FIG. 12 is a block diagram of a register architecture 1200 according to one embodiment of the invention. In the embodiment illustrated, there are 32 vector registers 1210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1100 operates on these overlaid register file as illustrated in the below tables.

| Adjustable Vector Length | Class | Operations | Registers |
|---|---|---|---|
| Instruction Templates that do not include the vector length field 1059B | A (FIG. 10A; U = 0) | 1010, 1015, 1025, 1030 | zmm registers (the vector length is 64 byte) |
| | B (FIG. 10B; U = 1) | 1012 | zmm registers (the vector length is 64 byte) |
| Instruction templates that do include the vector length field 1059B | B (FIG. 10B; U = 1) | 1017, 1027 | zmm, ymm, or xmm registers (the vector length is 64 byte, 32 byte, or 16 byte) depending on the vector length field 1059B |

In other words, the vector length field 1059B selects between a maximum length and one or more other shorter lengths, where each such shorter length is half the length of the preceding length; and instructions templates without the vector length field 1059B operate on the maximum vector length. Further, in one embodiment, the class B instruction templates of the specific vector friendly instruction format 1100 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1215—in the embodiment illustrated, there are 8 write mask registers (k0 through k7), each 64 bits in size. In an alternate embodiment, the write mask registers 1215 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1245, on which is aliased the MMX packed integer flat register file 1250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 13A:
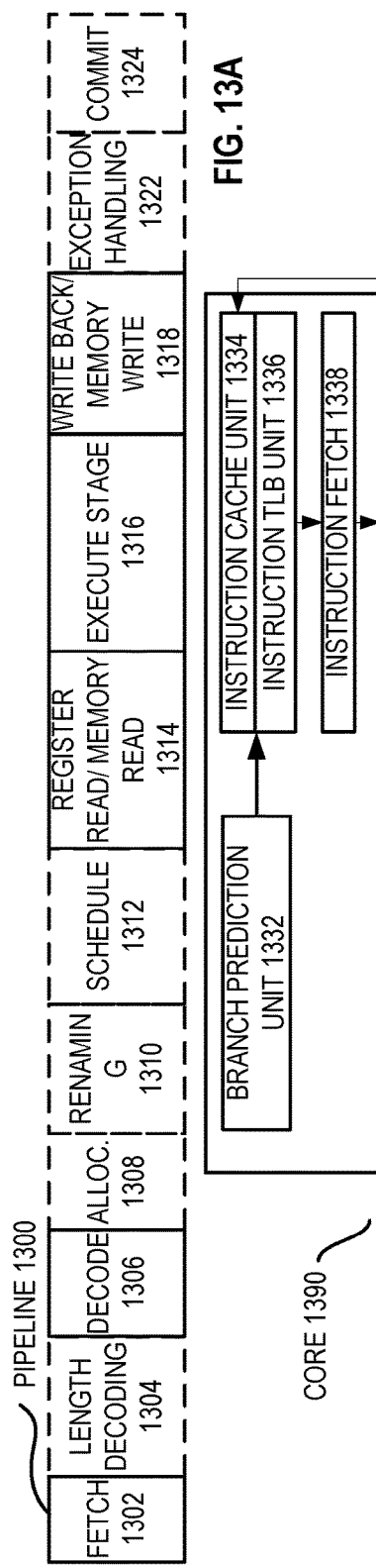
FIG. 13A is a block diagram illustrating both an exemplary in-order pipeline and an exemplary register renaming, out-of-order issue/execution pipeline according to embodiments of the invention.
Figure 13B:
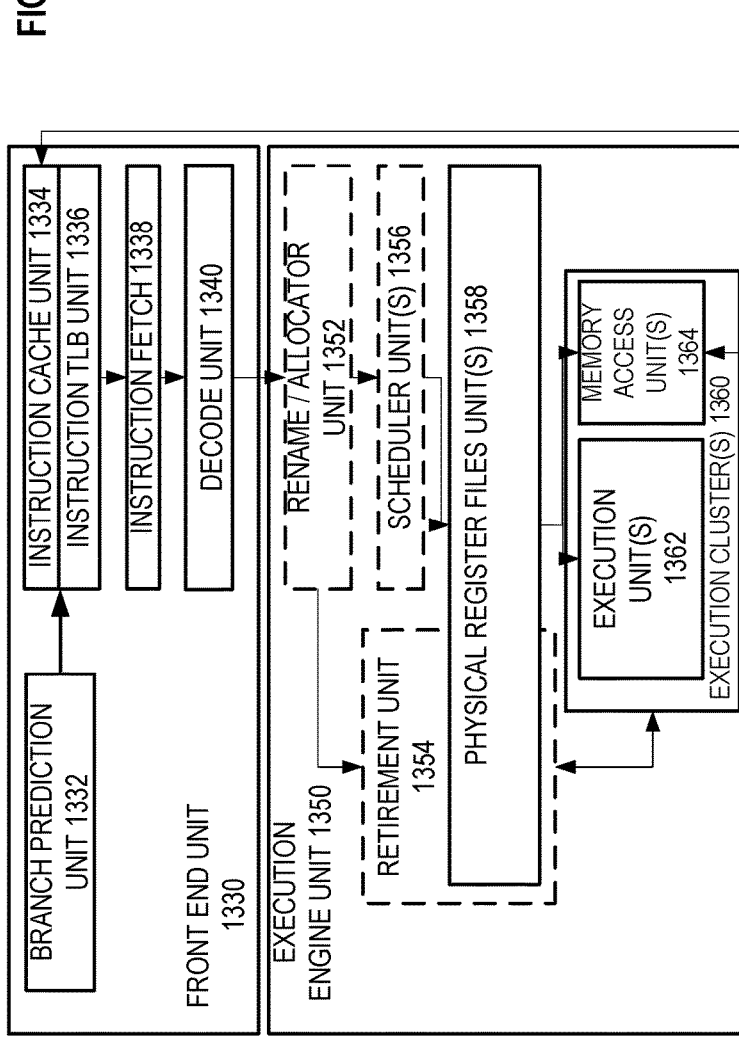
FIG. 13B is a block diagram illustrating both an exemplary embodiment of an in-order architecture core and an exemplary register renaming, out-of-order issue/execution architecture core to be included in a processor according to embodiments of the invention.

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments of the invention may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to embodiments of the invention. FIG. 14B includes an L1 data cache 1406A part of the L1 cache 1404, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Figure 15:
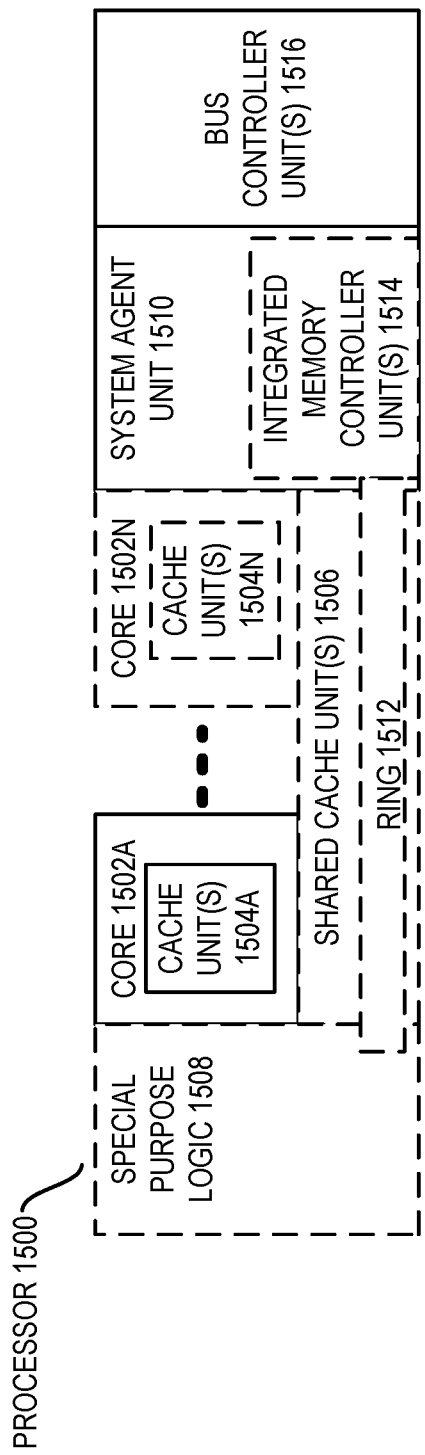
FIG. 15 is a block diagram of a processor that may have more than one core, may have an integrated memory controller, and may have integrated graphics according to embodiments of the invention.

FIG. 15 is a block diagram of a processor 1500 that may have more than one core, may have an integrated memory controller, and may have integrated graphics according to embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502-A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16, 17, 18, and 19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
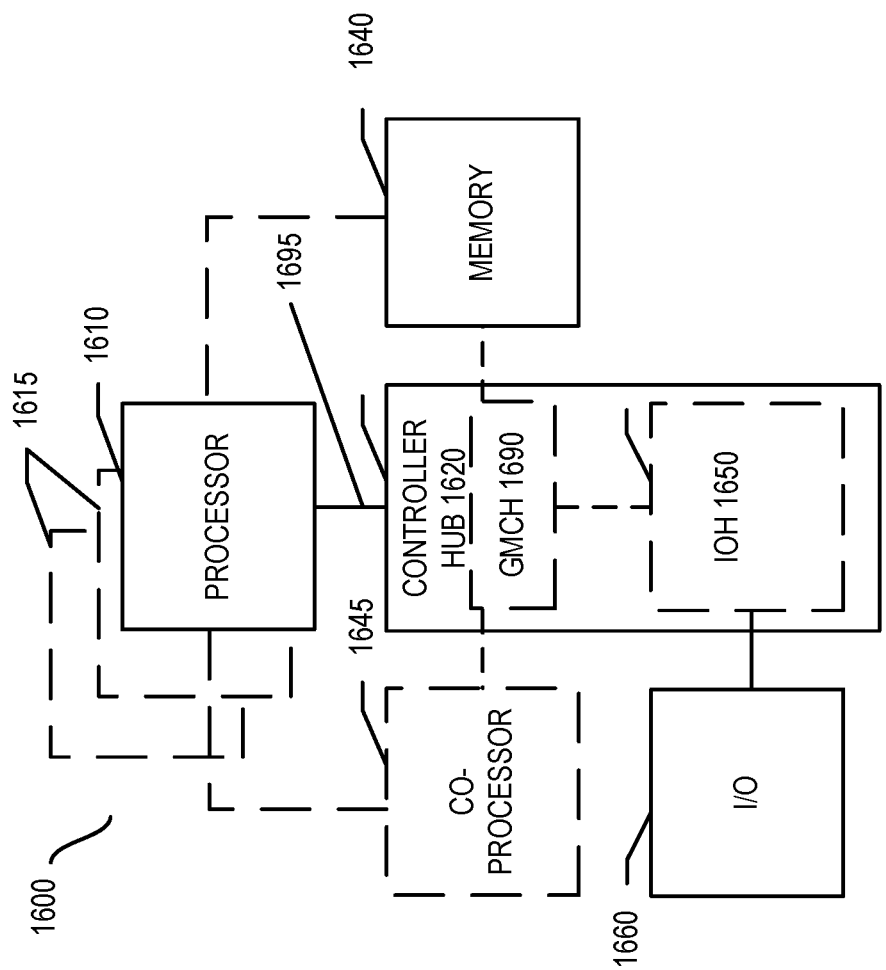
FIGS. 16, 17, 18, and 19 are block diagrams of exemplary computer architectures.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
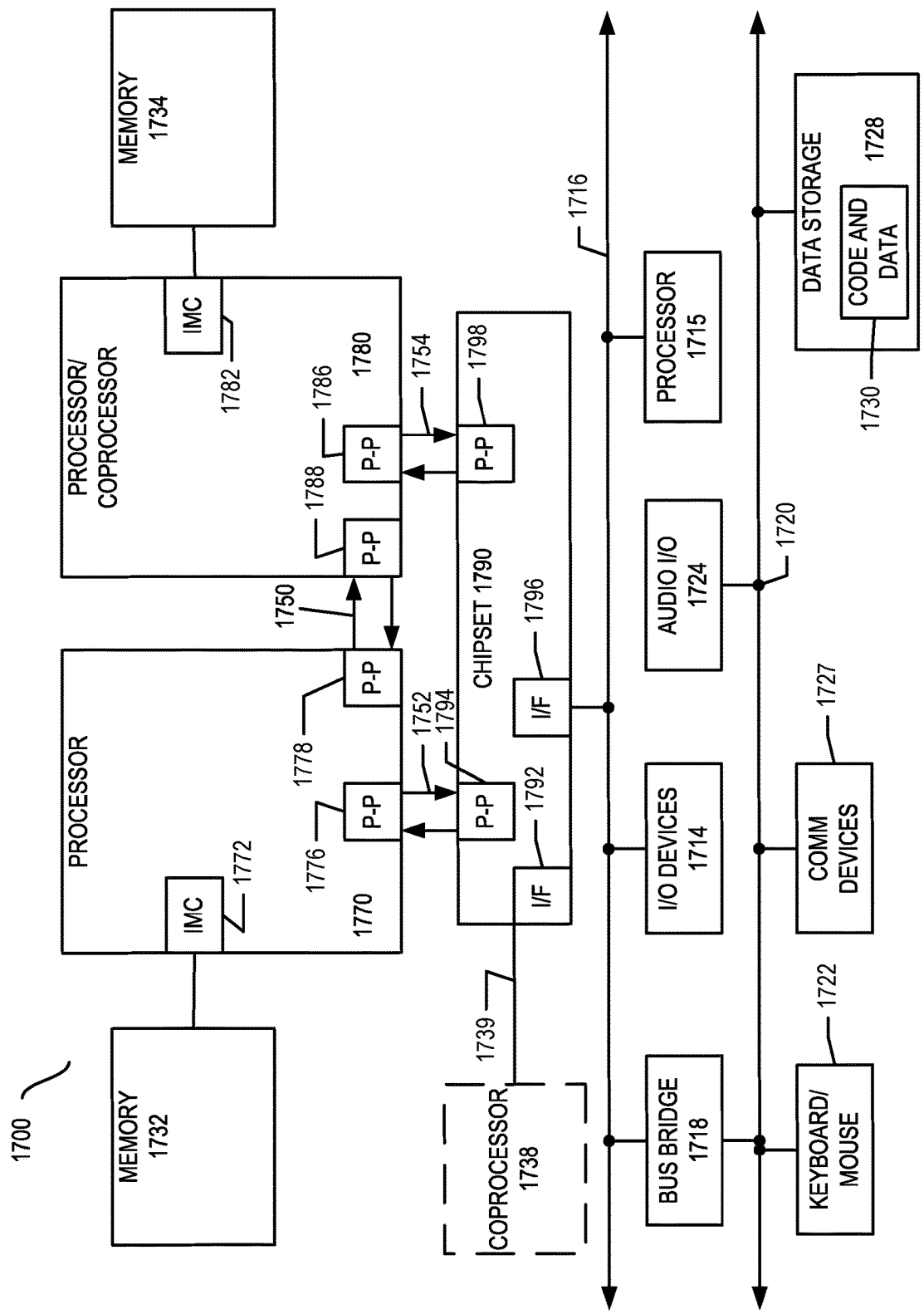

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the invention, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
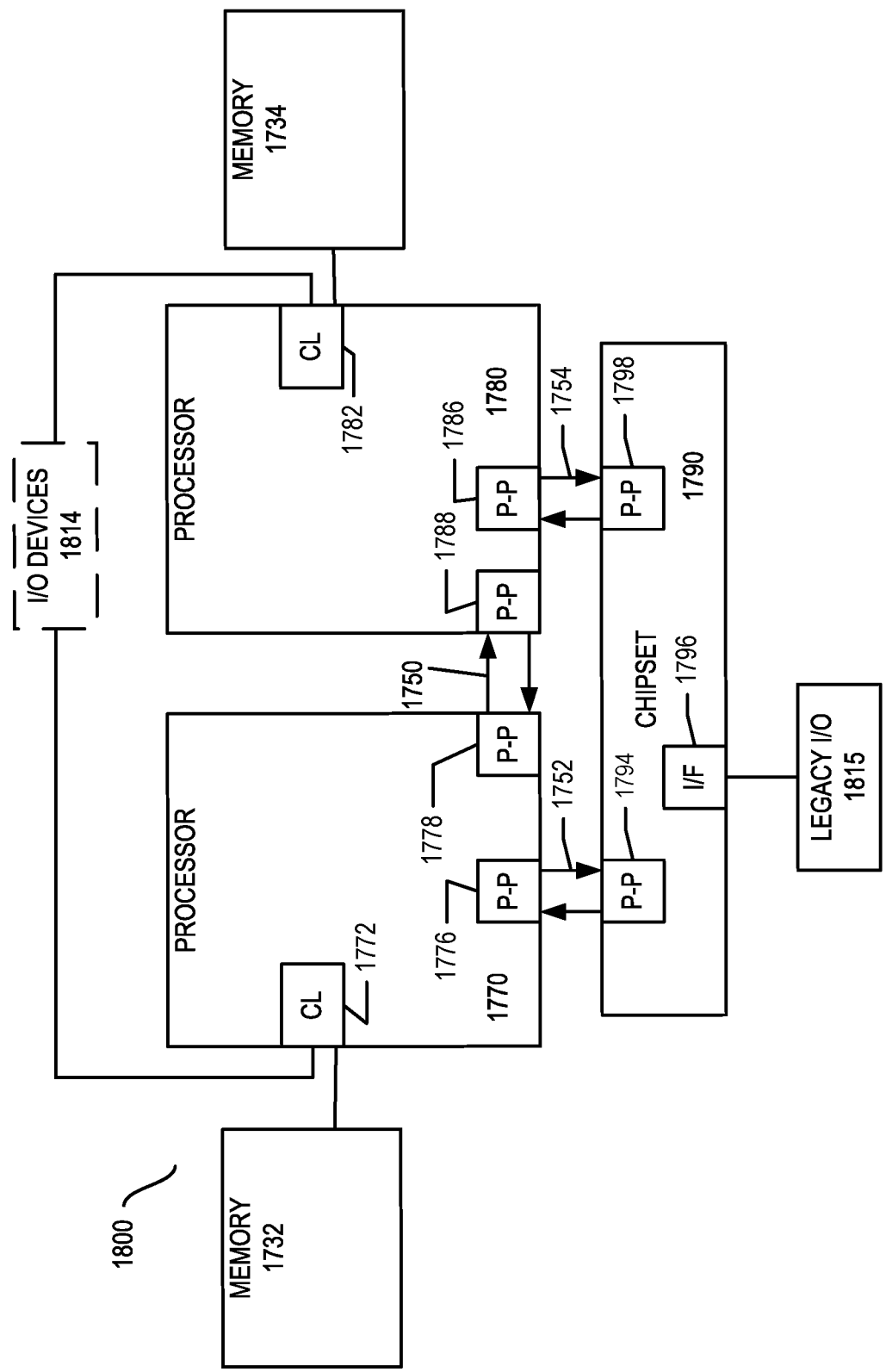

Referring now to FIG. 18, shown is a block diagram of a second more specific exemplary system 1800 in accordance with an embodiment of the present invention. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
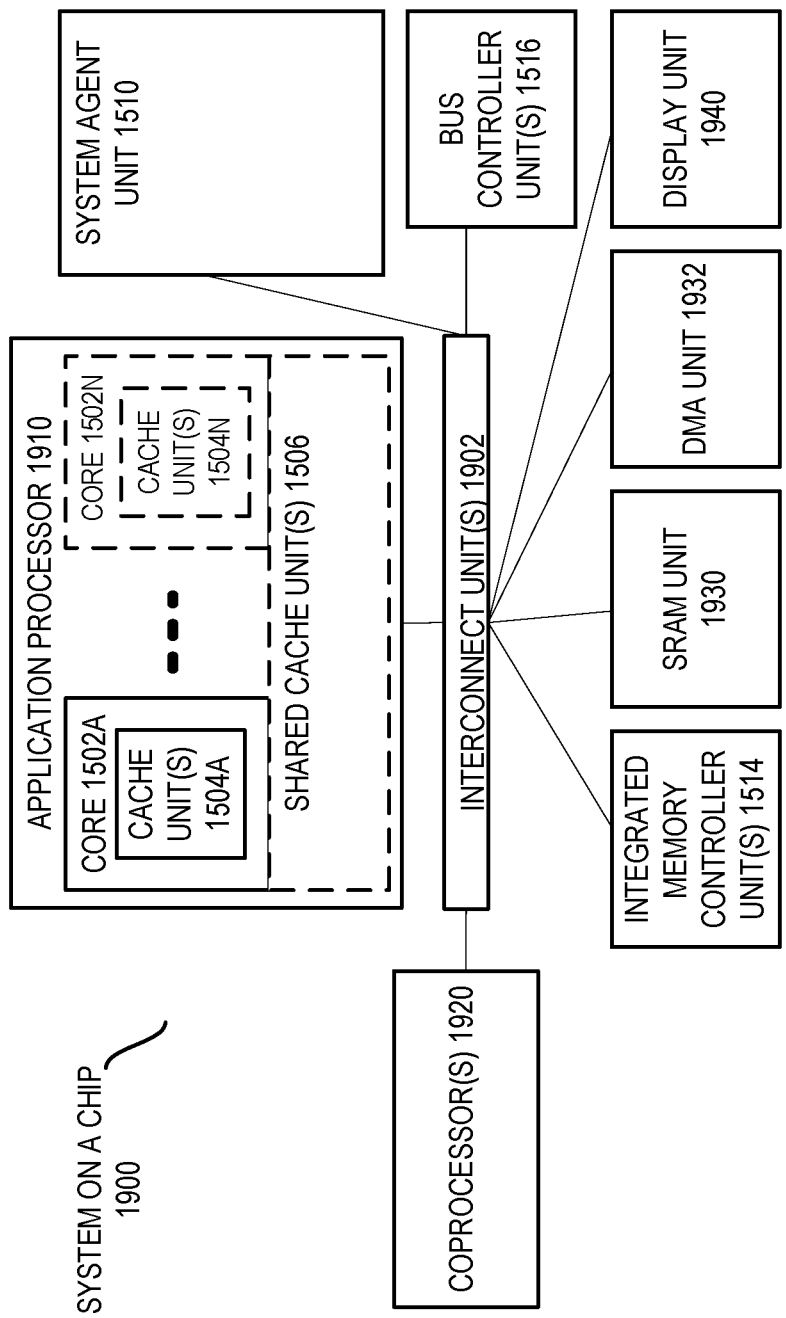

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 202A-N and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
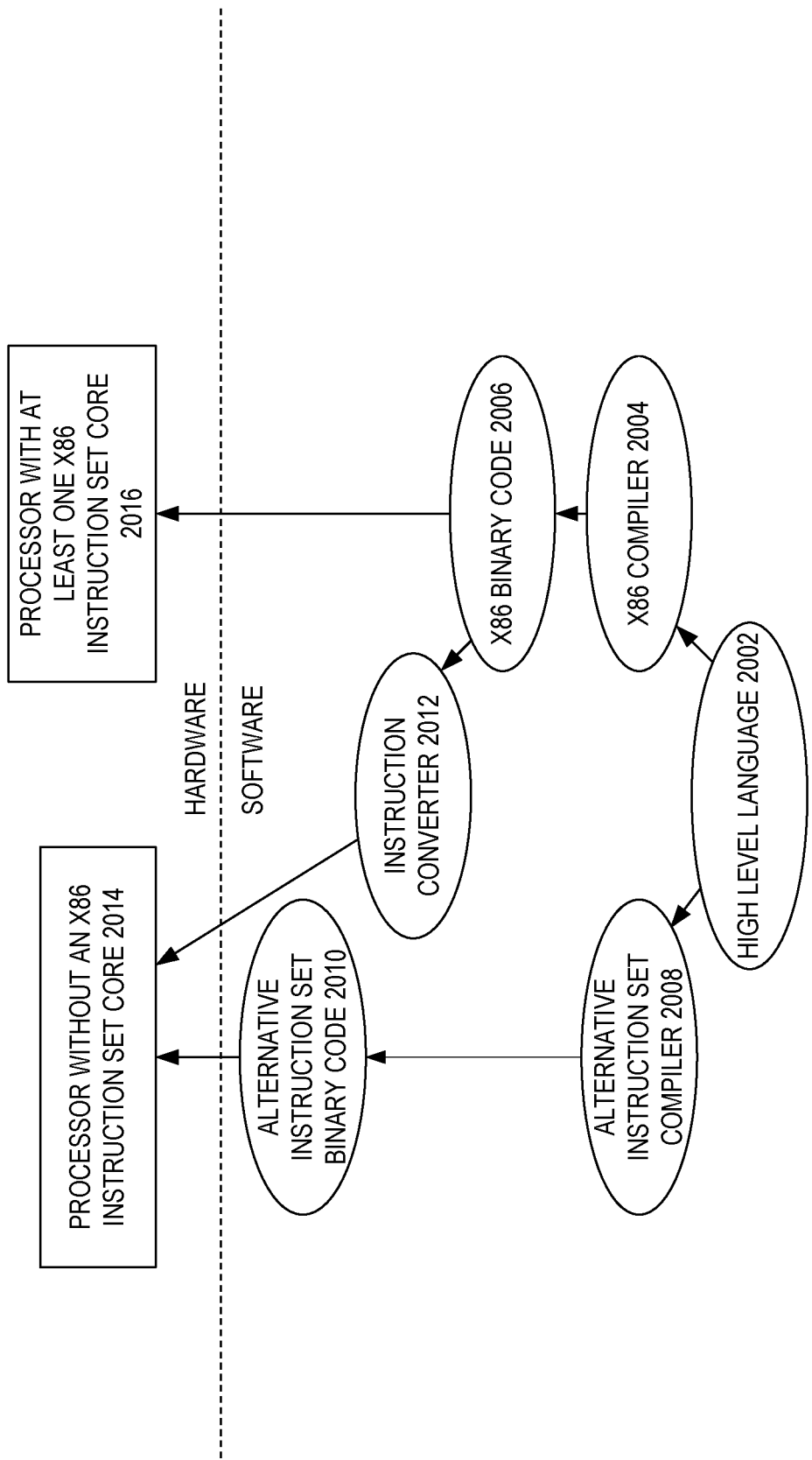
FIG. 20 is a block diagram contrasting the use of a software instruction converter to convert binary instructions in a source instruction set to binary instructions in a target instruction set according to embodiments of the invention.

FIG. 20 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

While FIGS. 8 and 9 illustrate various operations according to one or more embodiments, it is to be understood that not all of the operations depicted in FIGS. 8 and 9 are necessary for other embodiments. Indeed, it is fully contemplated herein that in other embodiments of the present disclosure, the operations depicted in FIGS. 8 and 9, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums and/or devices. Firmware may be embodied as code, instructions or instruction sets and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for decomposing systolic array circuitry to provide a plurality of N×N systolic sub-array circuits, apportioning a first tensor or array into a plurality of N×M first input arrays, and apportioning a second tensor or array into a plurality of M×N second input arrays. Systolic array control circuitry transfers corresponding ones of the first input arrays and second input arrays to a respective one of the plurality of N×N systolic sub-array circuits. As the elements included in the first input array and the elements included in the second input array are transferred to the systolic sub-array, the systolic sub-array performs one or more mathematical operations using the first and the second input arrays. The systems and methods beneficially improve the usage of the systolic array circuitry thereby advantageously reducing the number of clock cycles needed to perform a given number of calculations.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for decomposing systolic array circuitry to provide a plurality of N×N systolic sub-array circuits, apportioning a first tensor or array into a plurality of N×M first input arrays, and apportioning a second tensor or array into a plurality of M×N second input arrays.

According to example 1, there is provided a systolic array system. The system may include: systolic array circuitry and systolic array control circuitry to: decompose the systolic array circuitry into a plurality of N×N systolic sub-arrays; apportion a first input tensor into a first plurality of N×M input arrays and a second input tensor into a second plurality of M×N input arrays; and for each respective one of at least a portion of the plurality of N×N systolic sub-arrays, perform at least one mathematical operation to provide a respective one of a plurality of N×N results using corresponding ones of the N×M input arrays included in the first plurality of input arrays and the M×N input arrays included in the second plurality of input arrays.

Example 2 may include elements of example 1, where the systolic array control circuitry may further: combine the plurality of N×N results to provide an N×N output tensor.

Example 3 may include elements of any of examples 1 or 2 where the systolic array control circuitry may further: cause a transfer of the N×N output tensor to memory circuitry.

Example 4 may include elements of any of examples 1 through 3 where the at least one mathematical operation includes a multiplication operation; and the systolic array control circuitry to further: sum corresponding elements in each of the plurality of N×N results to provide an N×N output tensor.

Example 5 may include elements of any of examples 1 through 4 where the plurality of N×N systolic sub-arrays comprise a plurality of 2×2 systolic sub arrays; where the first plurality of N×M input arrays includes a plurality of 2×1 input arrays; and where the second plurality of M×N input arrays includes a plurality of 1×2 input arrays.

Example 6 may include elements of any of examples 1 through 5 where the systolic array control circuitry may further: cause a transfer of the first input tensor from memory circuitry; and cause a transfer of the second input tensor from memory circuitry.

According to example 7, there is provided a non-transitory storage device. The non-transitory storage device may include instructions that, when executed by systolic array control circuitry, cause the systolic array control circuitry to: decompose a systolic array circuitry into a plurality of N×N systolic sub-arrays; apportion a first input tensor into a first plurality of N×M input arrays and a second input tensor into a second plurality of M×N input arrays; and for each respective one of at least a portion of the plurality of N×N systolic sub-arrays, perform at least one mathematical operation to provide a respective one of a plurality of N×N results using corresponding ones of the N×M input arrays included in the first plurality of input arrays and the M×N input arrays included in the second plurality of input arrays.

Example 8 may include elements of example 7 where the instructions further cause the array control circuitry to: combine the plurality of N×N results to provide an N×N output tensor.

Example 9 may include elements of any of examples 7 or 8 where the instructions further cause the array control circuitry to: cause a transfer of the N×N output tensor to memory circuitry.

Example 10 may include elements of any of examples 7 through 9 where the instructions that cause the systolic array control circuitry to perform at least one mathematical operation to provide a respective one of a plurality of N×N results further cause the systolic array control circuitry to: perform a multiplication operation to provide a respective one of a plurality of N×N results.

Example 11 may include elements of any of examples 7 through 10 where the instructions further cause the systolic array control circuitry to: sum corresponding elements in each of the plurality of N×N results to provide an N×N output tensor.

Example 12 may include elements of any of examples 7 through 11 where the instructions that cause the systolic array control circuitry to decompose the systolic array circuitry into a plurality of N×N systolic sub-arrays further cause the systolic array control circuitry to: decompose the systolic array circuitry into a plurality of 2×2 systolic sub-arrays; and where the instructions that cause the systolic array control circuitry to apportion the first input tensor into the first plurality of N×M input arrays further cause the systolic array control circuitry to: apportion the first input tensor into a first plurality of 2×1 input arrays; and where the instructions that cause the systolic array control circuitry to apportion the second input tensor into the second plurality of M×N input arrays further cause the systolic array control circuitry to: apportion the second input tensor into a second plurality of 1×2 input arrays.

Example 13 may include elements of any of examples 7 through 12 where the instructions further cause the systolic array control circuitry to: cause a transfer of the first input tensor from memory circuitry; and cause a transfer of the second input tensor from the memory circuitry.

According to example 14, there is provided a systolic array method. The method may include: decomposing, by systolic array control circuitry, a systolic array circuitry into a plurality of N×N systolic sub-arrays; apportioning, by the systolic array control circuitry, a first input tensor into a first plurality of N×M input arrays and a second input tensor into a second plurality of M×N input arrays; and for each respective one of at least a portion of the plurality of N×N systolic sub-arrays, causing the systolic array circuitry to perform at least one mathematical operation to provide a respective one of a plurality of N×N results using corresponding ones of the N×M input arrays included in the first plurality of input arrays and the M×N input arrays included in the second plurality of input arrays.

Example 15 may include elements of example 14 and the method may additionally include: combining, by the systolic array control circuitry, the plurality of N×N results to provide an N×N output tensor.

Example 16 may include elements of any of examples 14 or 15 and the method may additionally include: transferring, by the systolic array control circuitry, the N×N output tensor to memory circuitry.

Example 17 may include elements of any of examples 14 through 16 where causing the systolic array circuitry to perform at least one mathematical operation to provide the plurality of N×N results comprises: causing the systolic array circuitry to perform a multiplication operation to provide the plurality of N×N results.

Example 18 may include elements of any of examples 14 through 17, and the method may additionally include: summing corresponding elements in each of the plurality of N×N results to provide an N×N output tensor.

Example 19 may include elements of any of examples 14 through 18 where decomposing the systolic array circuitry into the plurality of N×N systolic sub-arrays comprises: decomposing, by the systolic array control circuitry, the systolic array circuitry into a plurality of 2×2 systolic sub-arrays; where apportioning the first input tensor into the first plurality of N×M input arrays comprises: apportioning, by the systolic array control circuitry, the first input tensor into a first plurality of 2×1 input arrays; and where apportioning the second input tensor into the second plurality of M×N input arrays comprises: apportioning, by the systolic array control circuitry, the second input tensor into a second plurality of 1×2 input arrays.

Example 20 may include elements of any of examples 14 through 19, and the method may additionally include: transferring the first input tensor from memory circuitry coupled to the systolic array circuitry; and transferring the second input tensor from the memory circuitry.

According to example 21, there is provided a systolic array system. The system may include: means for decomposing a systolic array circuitry into a plurality of N×N systolic sub-arrays; means for apportioning a first input tensor into a first plurality of N×M input arrays and a second input tensor into a second plurality of M×N input arrays; and means for causing the systolic array circuitry to perform at least one mathematical operation to provide a respective one of a plurality of N×N results using corresponding ones of the N×M input arrays included in the first plurality of input arrays and the M×N input arrays included in the second plurality of input arrays for each respective one of at least a portion of the plurality of N×N systolic sub-arrays.

Example 22 may include elements of example 21, and the system may additionally include: means for combining the plurality of N×N results to provide an N×N output tensor.

Example 23 may include elements of any of examples 21 or 22, and the system may additionally include: means for transferring the N×N output tensor to memory circuitry.

Example 24 may include elements of any of examples 21 through 23 where the means for causing the systolic array circuitry to perform at least one mathematical operation to provide the plurality of N×N results comprises: means for causing the systolic array circuitry to perform a multiplication operation to provide the plurality of N×N results.

Example 25 may include elements of any of examples 21 through 24, and the system may additionally include: means for summing corresponding elements in each of the plurality of N×N results to provide an N×N output tensor.

Example 26 may include elements of any of examples 21 through 25 where the means for decomposing the systolic array circuitry into the plurality of N×N systolic sub-arrays comprises: means for decomposing the systolic array circuitry into a plurality of 2×2 systolic sub-arrays; where the means for apportioning the first input tensor into the first plurality of N×M input arrays comprises: means for apportioning the first input tensor into a first plurality of 2×1 input arrays; and where the means for apportioning the second input tensor into the second plurality of M×N input arrays comprises: means for apportioning the second input tensor into a second plurality of 1×2 input arrays.

Example 27 may include elements of any of examples 21 through 26 and the system may additionally include: means for transferring the first input tensor from memory circuitry to the systolic array circuitry; and means for transferring the second input tensor from the memory circuitry to the systolic array circuitry.

According to example 28, there is provided an electronic device. The device may include: processor circuitry; memory circuitry; systolic array circuitry; and systolic array control circuitry to: decompose the systolic array circuitry into a plurality of N×N systolic sub-arrays; apportion a first input tensor into a first plurality of N×M input arrays and a second input tensor into a second plurality of M×N input arrays; and for each respective one of at least a portion of the plurality of N×N systolic sub-arrays, perform at least one mathematical operation to provide a respective one of a plurality of N×N results using corresponding ones of the N×M input arrays included in the first plurality of input arrays and the M×N input arrays included in the second plurality of input arrays.

Example 29 may include elements of example 28 where the systolic array control circuitry to further: combine the plurality of N×N results to provide an N×N output tensor.

Example 30 may include elements of any of examples 28 or 29 where the systolic array control circuitry to may further: cause a transfer of the N×N output tensor to memory circuitry.

Example 31 may include elements of any of examples 28 through 30 where the at least one mathematical operation includes a multiplication operation; and where the systolic array control circuitry to further: sum corresponding elements in each of the plurality of N×N results to provide an N×N output tensor.

Example 32 may include elements of any of examples 28 through 31 where the plurality of N×N systolic sub-arrays comprise a plurality of 2×2 systolic sub arrays; where the first plurality of N×M input arrays includes a plurality of 2×1 input arrays; and where the second plurality of M×N input arrays includes a plurality of 1×2 input arrays.

Example 33 may include elements of any of examples 28 through 32 where the systolic array control circuitry to further: cause a transfer of the first input tensor from the memory circuitry to the systolic array circuitry; and cause a transfer of the second input tensor from memory circuitry to the systolic array circuitry.

According to example 35, there is provided a systolic array decomposition system, the system being arranged to perform the method of any of examples 14 through 20.

According to example 36, there is provided a chipset arranged to perform the method of any of examples 14 through 20.

According to example 36, there is provided least one machine-readable storage device that includes a plurality of instructions that, in response to be being executed on a computing device, cause the computing device to carry out the method according to any of examples 14 through 20.

According to example 37, there is provided a device that includes a systolic array decomposition system, the device being arranged to perform the method of any of the examples 14 through 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A system, comprising:
   systolic array circuitry; and
   systolic array control circuitry to:
      decompose the systolic array circuitry into a plurality of N×N systolic sub-arrays; and
      apportion a first input tensor into a first plurality of N×M input arrays and a second input tensor into a second plurality of M×N input arrays; and
      wherein each respective one of at least a portion of the plurality of N×N systolic sub-arrays is to perform at least one mathematical operation to provide a respective one of a plurality of N×N results using corresponding ones of the N×M input arrays included in the first plurality of N×M input arrays and the M×N input arrays included in the second plurality of M×N input arrays.

2. The system of claim 1, the systolic array control circuitry to further:
   combine the plurality of N×N results to provide one or more N×N output tensors.

3. The system of claim 2, the systolic array control circuitry to further:
   cause a transfer of the one or more N×N output tensors to memory circuitry.

4. The system of claim 1:
   wherein the at least one mathematical operation includes a multiplication operation; and
   the systolic array control circuitry to further:
      sum corresponding elements in each of the plurality of N×N results to provide one or more N×N output tensors.

5. The system of claim 1:
   wherein the plurality of N×N systolic sub-arrays comprise a plurality of 2×2 systolic sub arrays;
   wherein the first plurality of N×M input arrays includes a plurality of 2×1 input arrays; and wherein the second plurality of M×N input arrays includes a plurality of 1×2 input arrays.

6. The system of claim 1, the systolic array control circuitry to further:
cause a transfer of the first input tensor from memory circuitry; and
cause a transfer of the second input tensor from the memory circuitry.

7. A non-transitory storage device that includes instructions that, when executed by systolic array control circuitry, cause the systolic array control circuitry to:
decompose a systolic array circuitry into a plurality of N×N systolic sub-arrays;
apportion a first input tensor into a first plurality of N×M input arrays and a second input tensor into a second plurality of M×N input arrays; and
wherein each respective one of at least a portion of the plurality of N×N systolic sub-arrays is to perform at least one mathematical operation to provide a respective one of a plurality of N×N results using corresponding ones of the N×M input arrays included in the first plurality of N×M input arrays and the M×N input arrays included in the second plurality of M×N input arrays.

8. The non-transitory storage device of claim 7 wherein the instructions further cause the systolic array control circuitry to:
combine the plurality of N×N results to provide one or more N×N output tensors.

9. The non-transitory storage device of claim 8 wherein the instructions further cause the systolic array control circuitry to:
cause a transfer of the one or more N×N output tensors to memory circuitry.

10. The non-transitory storage device of claim 7 wherein the instructions further cause the systolic array control circuitry to:
transfer corresponding elements of the first plurality of N×M input arrays and the second plurality of M×N input arrays to the plurality of N×N systolic sub-arrays to cause performance of a multiplication operation to provide a respective one of the plurality of N×N results.

11. The non-transitory storage device of claim 10 wherein the instructions further cause the systolic array control circuitry to:
sum corresponding elements in each of the plurality of N×N results to provide the one or more N×N output tensors.

12. The non-transitory storage device of claim 7:
wherein the instructions that cause the systolic array control circuitry to decompose the systolic array circuitry into a plurality of N×N systolic sub-arrays further cause the systolic array control circuitry to:
decompose the systolic array circuitry into a plurality of 2×2 systolic sub-arrays;
wherein the instructions that cause the systolic array control circuitry to apportion the first input tensor into the first plurality of N×M input arrays further cause the systolic array control circuitry to:
apportion the first input tensor into a first plurality of 2×1 input arrays; and
wherein the instructions that cause the systolic array control circuitry to apportion the second input tensor into the second plurality of M×N input arrays further cause the systolic array control circuitry to:
apportion the second input tensor into a second plurality of 1×2 input arrays.

13. The non-transitory storage device of claim 10 wherein the instructions further cause the systolic array control circuitry to:
cause a transfer of the first input tensor from memory circuitry; and
cause a transfer of the second input tensor from the memory circuitry.

14. A method, comprising:
decomposing, by systolic array control circuitry, a systolic array circuitry into a plurality of N×N systolic sub-arrays;
apportioning, by the systolic array control circuitry, a first input tensor into a first plurality of N×M input arrays and a second input tensor into a second plurality of M×N input arrays; and
for each respective one of at least a portion of the plurality of N×N systolic sub-arrays, performing at least one mathematical operation to provide a respective one of a plurality of N×N results using corresponding ones of the N×M input arrays included in the first plurality of N×M input arrays and the M×N input arrays included in the second plurality of M×N input arrays.

15. The method of claim 14, further comprising:
combining, by the systolic array control circuitry, the plurality of N×N results to provide one or more N×N output tensors.

16. The method of claim 15, further comprising:
transferring, by the systolic array control circuitry, the one or more N×N output tensors to memory circuitry.

17. The method of claim 14 wherein performing the at least one mathematical operation to provide the plurality of N×N results comprises:
causing the systolic array circuitry to perform a multiplication operation to provide the plurality of N×N results.

18. The method of claim 17, further comprising:
summing corresponding elements in each of the plurality of N×N results to provide one or more N×N output tensors.

19. The method of claim 14:
wherein decomposing the systolic array circuitry into the plurality of N×N systolic sub-arrays comprises:
decomposing, by the systolic array control circuitry, the systolic array circuitry into a plurality of 2×2 systolic sub-arrays;
wherein apportioning the first input tensor into the first plurality of N×M input arrays comprises:
apportioning, by the systolic array control circuitry, the first input tensor into a first plurality of 2×1 input arrays; and
wherein apportioning the second input tensor into the second plurality of M×N input arrays comprises
apportioning, by the systolic array control circuitry, the second input tensor into a second plurality of 1×2 input arrays.

20. The method of claim 14, further comprising:
transferring the first input tensor from memory circuitry coupled to the systolic array circuitry; and
transferring the second input tensor from the memory circuitry.

21. A system, comprising:
means for decomposing a systolic array circuitry into a plurality of N×N systolic sub-arrays;
means for apportioning a first input tensor into a first plurality of N×M input arrays and a second input tensor into a second plurality of M×N input arrays; and
means for causing the systolic array circuitry to perform at least one mathematical operation to provide a respective one of a plurality of N×N results using corresponding ones of the N×M input arrays included in the first plurality of N×M input arrays and the M×N input arrays included in the second plurality of M×N input arrays for each respective one of at least a portion of the plurality of N×N systolic sub-arrays.

22. The system of claim 21, further comprising:
means for combining the plurality of N×N results to provide one or more N×N output tensors.

23. The system of claim 22, further comprising:
means for transferring the one or more N×N output tensors to memory circuitry.

24. The system of claim 21 wherein the means for causing the systolic array circuitry to perform at least one mathematical operation to provide the plurality of N×N results comprises:
means for causing the systolic array circuitry to perform a multiplication operation to provide the plurality of N×N results.

25. The system of claim 24, further comprising:
means for summing corresponding elements in each of the plurality of N×N results to provide one or more N×N output tensors.

26. The system of claim 21:
wherein the means for decomposing the systolic array circuitry into the plurality of N×N systolic sub-arrays comprises:
means for decomposing the systolic array circuitry into a plurality of 2×2 systolic sub-arrays;
wherein the means for apportioning the first input tensor into the first plurality of N×M input arrays comprises:
means for apportioning the first input tensor into a first plurality of 2×1 input arrays; and
wherein the means for apportioning the second input tensor into the second plurality of M×N input arrays comprises
means for apportioning the second input tensor into a second plurality of 1×2 input arrays.

27. The system of claim 21, further comprising:
means for transferring the first input tensor from memory circuitry to the systolic array circuitry; and
means for transferring the second input tensor from the memory circuitry to the systolic array circuitry.

\* \* \* \* \*